United States Patent
Kim et al.

(10) Patent No.: US 8,355,755 B2
(45) Date of Patent: Jan. 15, 2013

(54) MOBILE TERMINAL

(75) Inventors: Ha-Yong Kim, Chungcheongbuk-Do (KR); Yong-Duck Cha, Gyeonggi-Do (KR); Jong-Hwan Kim, Gyeonggi-Do (KR); Tae-Wan Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 12/716,227

(22) Filed: Mar. 2, 2010

(65) Prior Publication Data
US 2010/0227650 A1    Sep. 9, 2010

(30) Foreign Application Priority Data

Mar. 3, 2009 (KR) .................. 10-2009-0017911
Jul. 2, 2009 (KR) .................. 10-2009-0060347

(51) Int. Cl.
*H04M 1/00* (2006.01)
(52) U.S. Cl. .......... 455/566; 455/425; 455/550.1; 455/556.1; 455/556.2; 455/575.1; 455/575.2; 455/575.3; 455/575.4
(58) Field of Classification Search .......... 455/566, 455/425, 575.1–575.4, 575.8, 90.3, 95, 100
See application file for complete search history.

(56) References Cited

U.S. PATENT DOCUMENTS

| | | | |
|---|---|---|---|
| 8,005,518 B1 * | 8/2011 | Birsel et al. | 455/575.1 |
| 2002/0016191 A1 * | 2/2002 | Ijas et al. | 455/575 |
| 2004/0202316 A1 * | 10/2004 | Abe et al. | 379/451 |
| 2005/0143137 A1 * | 6/2005 | Matsunaga et al. | 455/566 |
| 2010/0157518 A1 * | 6/2010 | Ladouceur et al. | 361/679.09 |

* cited by examiner

*Primary Examiner* — Jinsong Hu
*Assistant Examiner* — Michael Nguyen
(74) *Attorney, Agent, or Firm* — Lee, Hong, Degerman, Kang & Waimey

(57) ABSTRACT

Disclosed is a mobile terminal including, first and second bodies rotatably coupled to each other, and a driving unit configured to allow a relative rotation of the first and second bodies between a closed configuration and an open configuration, the first and second bodies being overlaid by each other in the closed configuration and rotated away from each other in the open configuration, wherein the driving unit includes rotation motion units connected to each of the first and second bodies and configured to generate the relative rotation, and slide motion units cooperatively operating with the rotation motion unit and configured to relatively slide the first and second bodies with respect to the driving unit between the closed configuration and the open configuration.

16 Claims, 19 Drawing Sheets

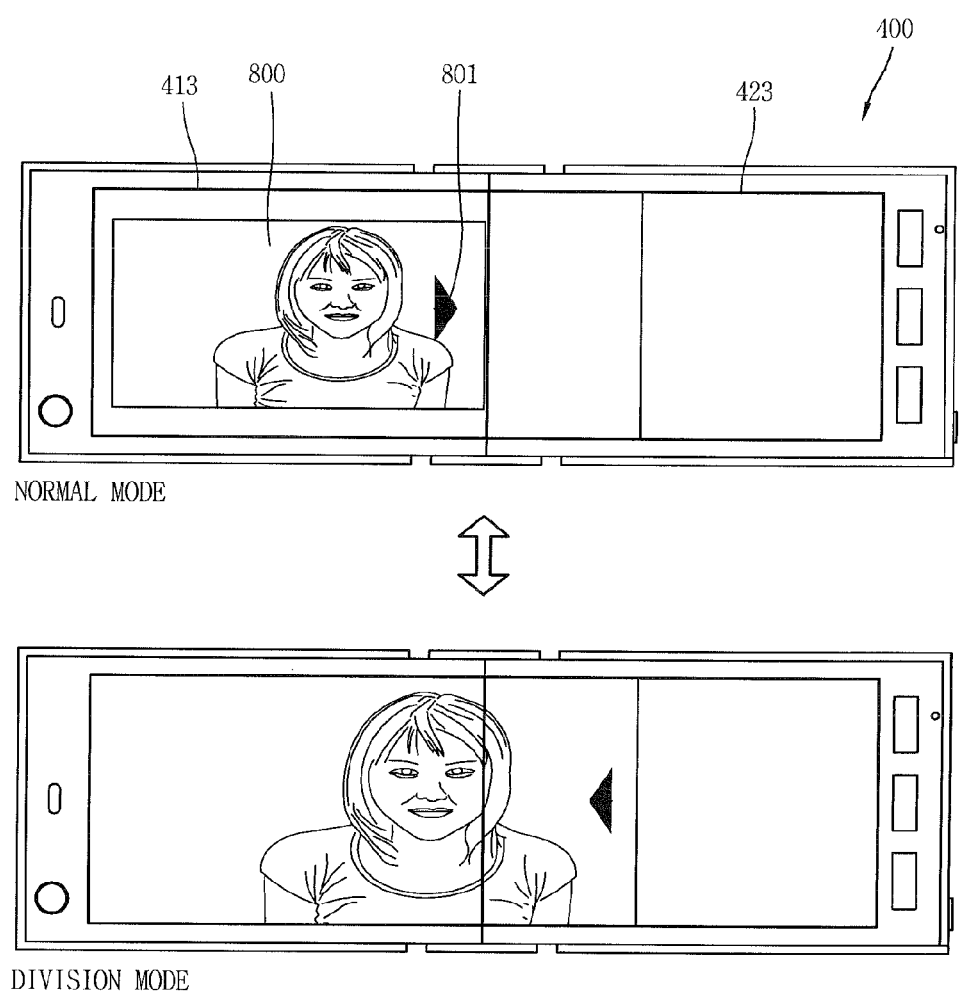

MOBILE TERMINAL

CROSS-REFERENCE TO RELATED APPLICATION

Pursuant to 35 U.S.C. §119(a), this application claims the benefit of earlier filing date and right of priority to Korean Application Nos. 10-2009-0017911 and 10-2009-0060347, filed in Republic of Korea on Mar. 3, 2009 and Jul. 2, 2009, the contents of which are incorporated by reference herein in its entirety.

BACKGROUND OF THE INVENTION

1. Field of the Invention

The present invention relates to a mobile terminal having one body relatively rotatable with respect to another body.

2. Background of the Invention

Terminals may be divided into mobile/portable terminals and stationary terminals according to their mobility. Also, the portable terminals may be categorized into a handheld terminal and a vehicle mount terminal according to whether it is directly portable by a user.

As it becomes multifunctional, the portable terminal can be allowed to capture still images or moving images, play music or video files, play games, receive broadcast and the like, so as to be implemented as an integrated multimedia player.

In order to support and enhance the complicated functions of the mobile terminal, improvement of structures of terminals or employment of a new user interface may be considered.

SUMMARY OF THE INVENTION

Therefore, an object of the present invention is to provide a mobile terminal having bodies coupled to be relatively rotatable in a different mechanism from the related art.

Another object of the present invention is to provide a mobile terminal having a plurality of display units disposed adjacent to each other in an open configuration.

Another object of the present invention is to provide users with a wider screen and more information by using a mobile terminal having at least two display units.

To achieve these and other advantages and in accordance with the purpose of the present invention, as embodied and broadly described herein, there is provided a mobile terminal including, first and second bodies rotatably coupled to each other, and a driving unit configured to allow a relative rotation of the first and second bodies between a closed configuration and an open configuration, the first and second bodies being overlaid by each other in the closed configuration and rotated away from each other in the open configuration, wherein the driving unit includes rotation motion units connected to each of the first and second bodies and configured to generate the relative rotation, and slide motion units cooperatively operating with the rotation motion unit and configured to relatively slide the first and second bodies with respect to the driving unit between the closed configuration and the open configuration.

According to one example of the present invention, each of the rotation motion unit may include a guide slot unit and first and second link members. The guide slot unit may be formed at a case configuring an outer appearance of the driving unit, and the first and second link members may have one ends movable along the guide slot unit and another ends connected to the first and second bodies, respectively. Rotation protrusions and linear motion protrusions may be formed at the one ends of the first and second link members, respectively. The guide slot unit may include rotation slots and linear motion slots. The rotation slots may be connected to the rotation protrusions and have an arcuate shape for allowing rotation of the one ends of the first an second link members, and the linear motion slots may be connected to the linear motion protrusions and linearly formed in radial directions of the rotation slots, respectively.

According to another example of the present invention, the rotation motion unit may include a first connection link and a second connection link. The first connection link may be connected to each of the rotation protrusion and the linear motion protrusion of the first link member, and the second connection link may have the same shape as that of the first connection link and be connected to each of the rotation protrusion and the linear motion protrusion of the second link member. The first and second connection links may be provided with a plurality of insertion grooves, respectively, such that the rotation protrusions and the linear motion protrusions of the first and second link members are inserted into the plurality of insertion grooves.

According to another example of the present invention, the driving unit may include connection member each configured to connect the first and second connection links. The first and second connection links may be provided with connection member protrusions, respectively. The connection member may be provided with connection member slots configured to guide linear motions of the connection member protrusions. The connection member slots may be formed in the same direction as the linear motion slots.

According to another example of the present invention, each of the slide motion units may include guide wings and guide rails. The guide wings may be formed at both ends of the connection member, and the guide rails may be formed at the case and engaged with the guide wings to render the guide wings guide the sliding of the connection member. The case of the driving unit may be formed such that a surface thereof facing the first and second bodies obscures one ends of the first and second bodies in the closed configuration. The one ends of the first and second bodies may be configured to press the facing surface of the case responsive to the relative rotation. The connection member may be moved along the guide rail responsive to the pressing. The rotation motion units may allow the first and second bodies to be relatively rotated such that the one surfaces of the first and second bodies are in parallel to each other in the open configuration. The connection members may be slid in a perpendicular direction to the one surfaces in parallel to each other in the open configuration, responsive to the relative rotation.

According to another example of the present invention, the case may include recess portions and covers. The recess portions may be formed by being recessed and accordingly the slide motion units may be disposed in the recess portions. The covers may be configured to obscure the recess portions. Each of the rotation motion units may include a hinge unit. The hinge unit may be configured to couple the first and second bodies by a hinge between the first and second bodies. Each of the slide motion units may include guide slots and guide protrusions. The guide slots may be formed at the first and second bodies, respectively, and each may have an arcuate shape so as to allow the relative rotation of the first and second bodies. The guide protrusions may be formed at the case defining an outer appearance of the driving unit and inserted into the guide slots. The case of the driving unit may be formed such that a surface thereof facing the first and second bodies obscures one ends of the first and second bodies in the closed configuration. The one ends of the first and second bodies may press the facing surface of the case responsive to the relative rotation, and the guide protrusions may be moved along the guide slots responsive to the pressing.

According to another example of the present invention, the driving unit may include first and second cases. The first case may configure an outer appearance of the driving unit and be formed in parallel to one ends of the first and second bodies in the closed configuration. The second case may be formed to intersect with the first case and configured to obscure end portions intersecting with the one ends.

According to another example of the present invention, first and second windows may be mounted to one surfaces of the first and second bodies. The first and second windows may extend to one ends of the first and second bodies so as to be adjacent to each other in the open configuration. Openings may be formed at side surfaces of the first and second bodies, the side surfaces being disposed adjacent to each other in the open configuration. The first and second windows may extend to the openings to define dual display units adjacent to each other.

To achieve the objects of the present invention in accordance with another embodiment of the present invention, there is provided a mobile terminal including first and second bodies having recessed regions at one surfaces thereof, respectively, and rotatably coupled to each other, the recessed regions each having one side surface open, wherein the one side surfaces define the recessed regions, respectively, first and second windows inserted into the recessed regions such that end portions thereof are obscured, the first and second windows extending to the open portions so as to define dual display units adjacent to each other, and a driving unit configured to allow a relative rotation of the first and second bodies between a closed configuration and an open configuration, the first and second windows facing each other in the closed configuration and disposed on the same flat surface in the open configuration, wherein the driving unit is configured to obscure the first and second windows exposed through the open portions, and to be slid in a perpendicular direction to the same flat surface responsive to the relative rotation of the first and second bodies.

According to another example of the present invention, the driving unit may include first and second cases. The first case may configure an outer appearance of the driving unit and be configured to obscure the open portions in the closed configuration. The second case may be formed to intersect with the first case and configured to obscure end portions of the first and second bodies, the end portions formed in a direction intersecting with the open portions. The driving unit may include rotation motion units and slide motion units. The rotation motion units may be connected to the first and second bodies to generate the relative rotation and mounted in the second case, and the slide motion units may be cooperatively operating with the rotation motion units and configured to relatively slide at least one of the first and second cases with respect to the first and second bodies between the closed configuration and the open configuration.

To achieve the objects of the present invention, there is provide an image displaying method in a mobile terminal, the method including providing first image data, displaying a main part of the first image data on a first display unit and a sub part of the first image data on a second display unit, generating a rotation detection signal upon detecting the rotation of the mobile terminal, and swapping the main part displayed on the first display unit and the sub part displayed on the second display unit for displaying, upon generation of the rotation detection signal.

According to another example of the present invention, the method may further include displaying a control menu on a sub part non-displayed region of the second display unit, wherein the second display unit may be a touch screen.

According to another example of the present invention, the method may further include displaying additional information relating to the image on the sub part non-displayed region of the second display unit.

According to another example of the present invention, the method may further include displaying second image on the sub part non-displayed region of the second display unit.

According to another example of the present invention, the method may further include displaying call-related information on the sub part non-displayed region of the second display unit.

According to another example of the present invention, displaying the sub part of the first image data on the first display unit and the main part of the first image data on the second display unit upon the generation of the rotation detection signal may include storing the first image data and reproducing the stored first image data after a preset time elapses.

According to another example of the present invention, displaying the sub part of the first image data on the first display unit and the main part of the first image data on the second display unit upon the generation of the rotation detection signal may include displaying a still image of the first image data, according to the rotation detection signal, and storing the first image data.

According to another example of the present invention, displaying the main part of the first image data on the first display unit and the sub part of the first image data on the second display unit may include displaying a icon for controlling the size of the first image data on an end of the sub part, and changing the size of the first image data responsive to the movement of the icon.

In accordance with another embodiment of the present invention, there is provided a mobile terminal including a memory configured to store first image data, a first display unit configured to display a main part of the first image data, a second display unit configured to display a sub part of the first image data, a sensing unit configured to detect a rotation of the display unit so as to generate a rotation detection signal, and a controller configured to swap the main part displayed on the first display unit with the sub part displayed on the second display unit for displaying.

According to another example of the present invention, the second display unit may be a touch screen, and the second display unit may further display a control menu for the first image data on the sub part non-displayed region.

According to another example of the present invention, the second display unit may further display additional information relating to the first image data on the sub part non-displayed region.

According to another example of the present invention, the second display unit may further display second image data on the sub part non-displayed region.

According to another example of the present invention, the second display unit may further display call-related information on the sub part non-displayed region.

According to another example of the present invention, the controller may be configured to store the first image data in the memory according to the rotation detection signal and to reproduce the stored first image data after a preset time elapses.

According to another example of the present invention, the controller may be configured to display still image of the first image data, according to the rotation detection signal, and store the first image data in the memory.

According to another example of the present invention, the controller may be configured to display an icon for controlling a size of the first image data on an end of the sub part.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 12 is an image view illustrating an example of changing a size of an image in the mobile terminal adapting the image displaying method in accordance with the one embodiment of the present invention;

DETAILED DESCRIPTION OF THE INVENTION

Figure 1:
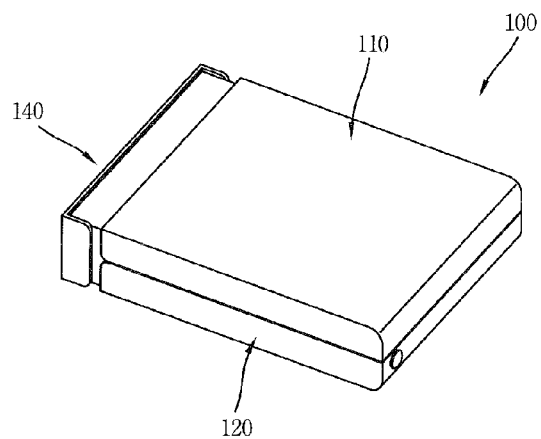
FIG. 1 is a perspective view illustrating a closed configuration of a mobile terminal in accordance with one embodiment of the present invention.

Description will now be given in detail of a portable terminal according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Description will now be given in detail of an expansion module and a mobile electronic device having the same according to the present invention, with reference to the accompanying drawings. This specification employs like/similar reference numerals for like/similar components irrespective of different embodiments, so they all will be understood by the first description.

Figure 2:
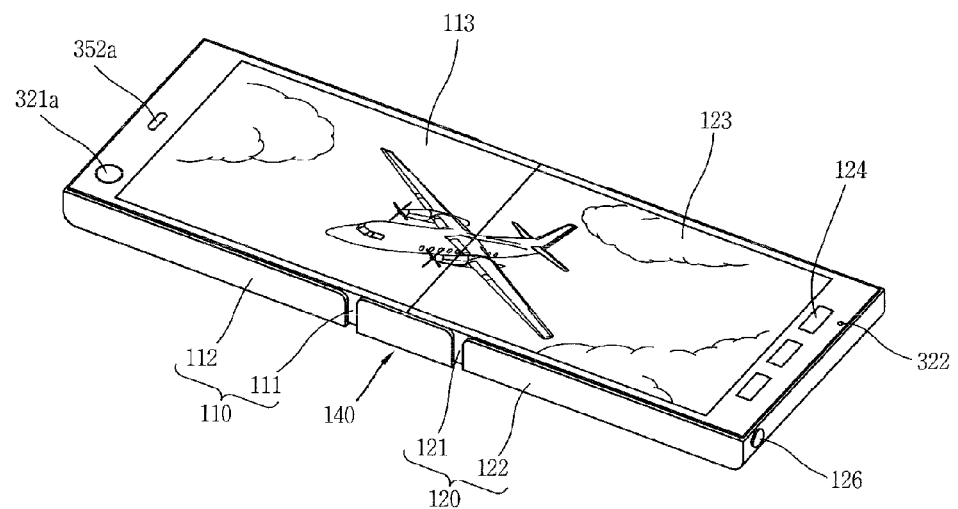
FIG. 2 is a perspective view illustrating an open configuration of the mobile terminal of FIG. 1.

As shown in FIGS. 1 and 2, a mobile terminal 100 may include a first body 110 and a second body 120 having at least one side foldable or unfoldable with respect to the first body 110. The mobile terminal 100 illustrated in FIGS. 1 and 2 exemplarily especially shows a folder type mobile terminal; however, the mobile terminal according to the present invention may not be limited to the folder type, but rather be applicable to various types, such as a swivel type, a flip type and the like.

As shown in FIG. 1, if the first body 110 is overlaid on the second body 120, the state may be referred to as a closed configuration. One surface of the first body 110 and one surface of the second body 120 may face each other in the closed configuration. As shown in FIG. 2, a state where the first and second bodies 110 and 120 have rotated away from each other may be referred to as an open configuration. The one surfaces of the first and second bodies 110 and 120 may be disposed in parallel to each other in the open configuration. To this end, the first and second bodies 110 and 120 may be rotatable by 90°, respectively, upon switching from the closed configuration to the open configuration.

The mobile terminal normally operates in a standby mode in the closed configuration but such standby mode may be released by a user's manipulation. The mobile terminal 100 may be operable in a communication mode and the like in the open configuration, but it be converted into the standby mode according to the user's manipulation or after a preset time elapses.

Functions or components to be disposed at each one surface of the first and second bodies 110 and 120 may be determined in various manners depending on which functions are emphasized in the mobile terminal 100 or what kind of user interfaces are pursued. As one example, a first display unit 113, as shown in FIG. 2, may be disposed on one surface of the first body 110 and a second display unit 123 may be disposed on one surface of the second body 120. Hereinafter, the one surfaces of the first and second bodies 110 and 120 having the first and second display units 113 and 123, respectively, may be preferred to as upper surfaces.

Referring to FIG. 2, a case (housing, casing, cover, etc.) forming the outside of the first body 110 is formed by a front case 111 and a rear case 112. In addition, various electronic components may be disposed in a space between the front case 111 and the rear case 112. At least one intermediate case may additionally be disposed between the front case 111 and the rear case 112. Further, the cases can be formed of resin in a manner of injection molding, or formed using metallic materials such as stainless steel (STS) and titanium (Ti).

Similar to the first body 110, a front case 121 and a rear case 122 may configure the second body 120.

First and second display units 113 and 123, a first audio output module 352a, a first camera 321a, a first manipulation unit 124 and a microphone 322 may be disposed at the first and second bodies 110 and 120.

In detail, the front case 111 of the first body 110 and the front case 121 of the second body 120 are shown having the first and second display units 113 and 123, the first audio output module 352a, the first camera 321a, the first manipulation unit 124 and the microphone 322.

Upon a relative rotation between the first and second bodies 110 and 120, the first and second display units 113 and 123, which are located on the overlapped upper surfaces of the first and second bodies 110 and 120 in the closed configuration (see FIG. 1), are externally exposed.

The exposed first and second display units 113 and 123 may serve as a dual display which displays one image information via a plurality of regions. For example, if an image to be displayed is an airplane, a front part of the airplane is displayed on the first display unit 113 and a rear part of the airplane is displayed on the second display unit 123. As the first and second display units 113 and 123 are adjacent to each other, the airplane may be output as one connected image.

The first and second display units 113 and 123 may be configured to display visible information, examples of which include a liquid crystal display (LCD) module, an organic light emitting diodes (OLED) module, a transparent OLED (TOLED) and the like.

The first and second display units 113 and 123 may further include a touch screen so as to allow a user to perform a touch input. For a call connection, the first and second display units 113 and 123 may output numeral keys which are touchable for input.

The first and second display units 113 and 123 may be configured to generate various tactile effects which a user can feel upon a touch input. Such function can be implemented by employing a haptic module cooperating with the first and second display units 113 and 123. The haptic module can generate tactile effects, representatively, a vibration. Such haptic module may differently be disposed depending on the configuration of the mobile terminal 100 as well as the configuration of the first and second display units 113 and 123.

The first audio output module 352a may be configured as a receiver or a speaker. The first camera 321a may be a camera module for allowing a user to capture images or video. The first manipulation unit 124 may receive a command input to control the operation of the mobile terminal 100. The microphone 322 may be disposed symmetrical to the first audio output module 352a based upon the first and second display units 113 and 123.

A broadcast signal receiving antenna 126 in addition to an antenna for communication may be disposed at one side of the second body 120. The antenna 126 may be retractable into the second body 120.

Figure 3:
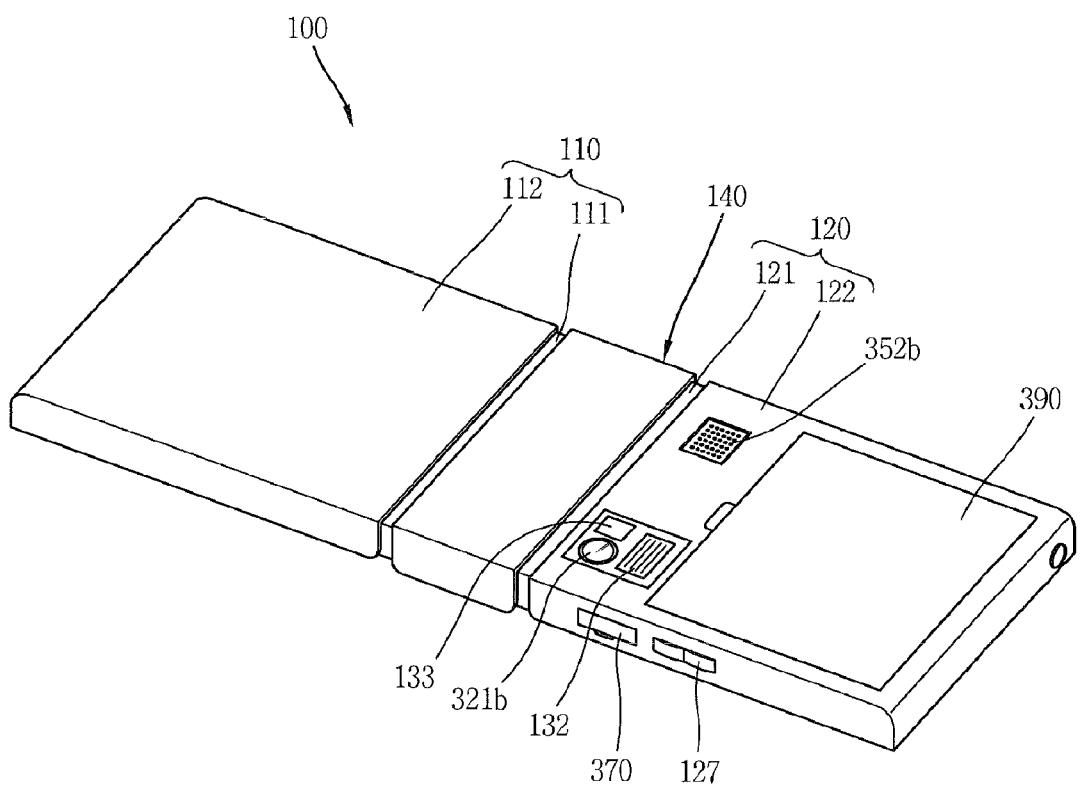
FIG. 3 is a rear perspective view of the mobile terminal of FIG. 2.

FIG. 3 is a rear perspective view of the mobile terminal 100 of FIG. 2.

As shown in FIG. 3, a second manipulation unit 127, an interface unit 370 and the like may be disposed at a side surface in parallel to (facing) the upper surface of the second body 120.

The first and second manipulation units 124 and 127 can be referred to as a user input portion 330 (see FIG. 8), which can be manipulated in any tactile manner that user can make a touch input.

For example, the user input portion can be implemented as a dome switch or touchpad which can receive information or commands input by a user in a pushing or touching manner, or implemented in a manner of using a wheel, a jog or a joystick to rotate keys.

Regarding each function, the first manipulation unit 124 can be used for inputting commands such as START, END, SCROLL, numbers, characters, symbols or the like, and the second manipulation unit 127 can function as a hot key for activating a specific function, such as activation of the first camera 321a.

The interface unit 370 may interface the mobile terminal 100 and external devices so as to allow data exchange therebetween or the like. For example, the interface unit 370 may be at least one of a wired/wireless access terminal for earphones, a short-range communication port (e.g., IrDA port, BLUETOOTH port, wireless Lan port, and the like), and power supply terminals for supplying power to the mobile terminal.

The interface unit 370 may be a card socket for accommodating an external card such as Subscriber Identification Module (SIM), User Identity Module (UIM), memory card for storing information, or the like.

A power supply unit 390 for supplying power to the mobile terminal 100 may be mounted to the second body 120. The power supply unit 390 may be a rechargeable battery, for example, which is attachable or detachable for charging.

A second camera 321b may further be disposed at the rear case 122 of the second body 120. The second camera 321b faces a direction which is substantially opposite to a direction faced by the first camera 321a (see FIG. 1). Also, the second camera 321b may be a camera having different pixels from those of the first camera 321a.

For instance, the first camera 321a may operate with relatively lower pixels (lower resolution). Thus, the first camera 321a may be useful when a user can capture his face and send it to another party during a video call or the like. On the other hand, the second camera 321b may operate with relatively higher pixels (higher resolution) such that it can be useful for a user to obtain higher quality pictures for later use.

A flash 132 and a mirror 133 may be disposed adjacent to the second camera 321b. The flash 132 operates in conjunction with the second camera 321b when taking a picture using the second camera 321b. The mirror 133 can cooperate with the second camera 321b to allow a user to photograph himself in a self-portrait mode.

A second audio output module 352b may further be disposed at the rear case 122.

The second audio output module 352b can cooperate with the first audio output module 352a (see FIG. 1) to provide stereo output. Also, the second audio output module 352b may be configured to operate as a speakerphone.

As described above, it has been described that the second camera 321b is disposed at the rear case 122; however, the present invention may not be limited to the configuration. It is also possible that one or more of those components (e.g., 132, 133, 352b), which have been described to be implemented on the rear case 122, such as the second camera 321b, will be implemented on the first body 110, particularly, on the rear case 112. In addition, without the second camera 321b, the first camera 321a can be implemented to be rotatable so as to rotate up to a direction which the second camera 321b faces.

Referring to FIGS. 1 to 3, the first and second bodies 110 and 120 are rotatably coupled by a driving unit 140. The driving unit 140 may be employed to allow a relative rotation of the first and second bodies 110 and 120 between the closed configuration and the open configuration. The driving unit 140 may be disposed at side surfaces of the first and second bodies 110 and 120, such that the first and second display units 113 and 123 may be located adjacent to each other.

Figure 4A:
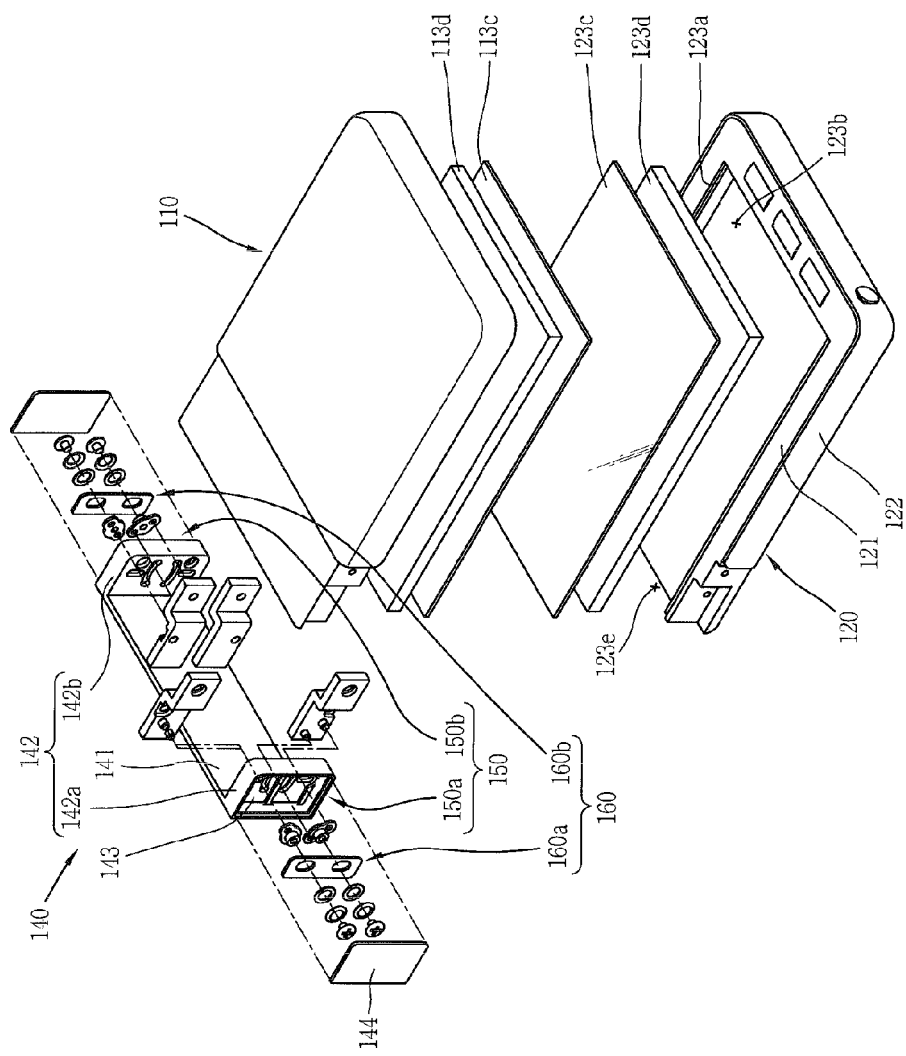
FIG. 4A is a disassembled perspective view of the mobile terminal of FIG. 1.
Figure 4B:
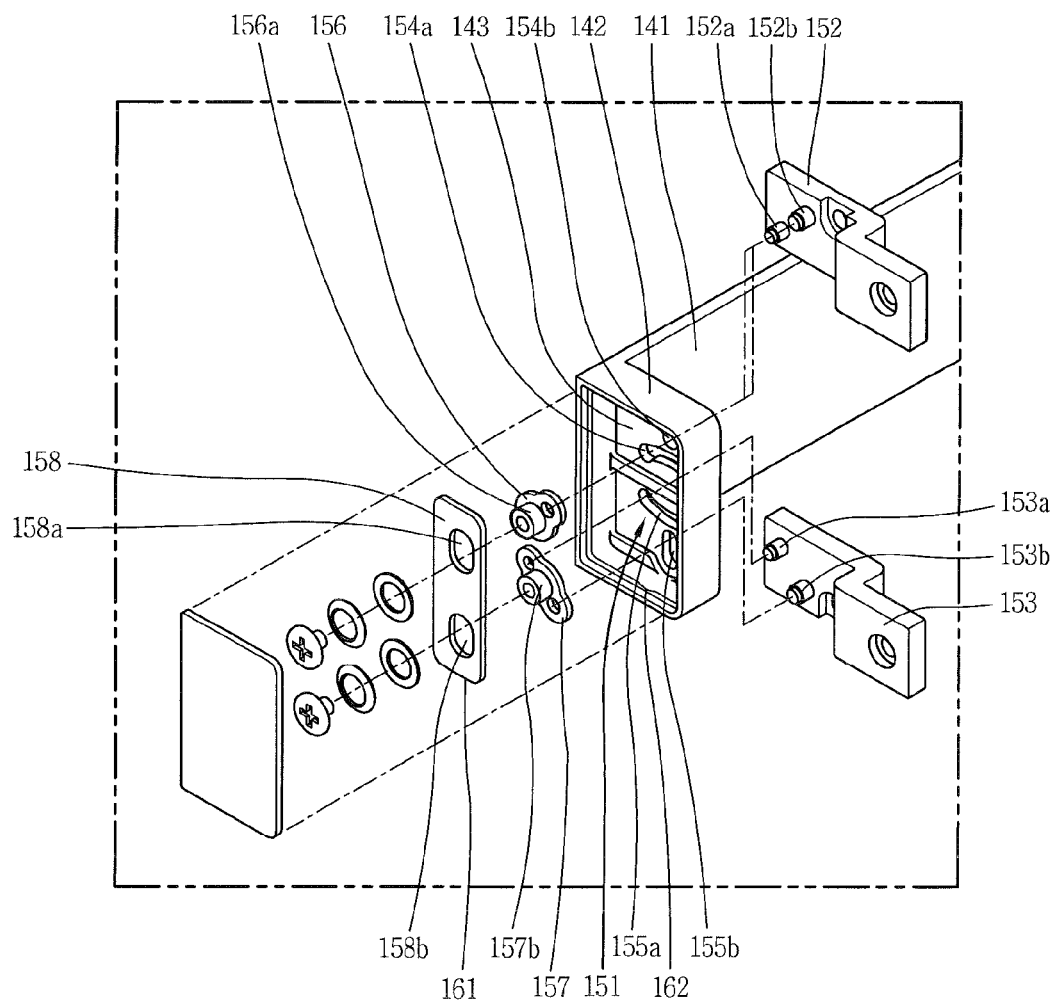
FIG. 4B is an enlarged view of a driving unit of FIG. 4A.

FIG. 4A is a disassembled perspective view of the mobile terminal of FIG. 1, FIG. 4B is an enlarged view of the driving unit of FIG. 4A, and FIGS. 5A to 5C are overviews respectively illustrating an operation of the driving unit of FIG. 4A.

Each of one surfaces of the first and second bodies 110 and 120 rotatably coupled to each other may include a recessed region 123a. The one surfaces face each other in the closed configuration, and denote the upper surfaces of the front cases 111 and 121 (see FIG. 2) having the display units 113 and 123.

Each recessed region 123a may define a window hole 123b formed at the front case 121. A window 123c for covering the window hole 123b may be mounted into the recessed region 123a. Windows 113c and 123c may include a first window 113c mounted to the first body 110 and a second window 123c mounted to the second body 120. The second window 123c may be inserted into the recessed region 123a such that an end portion thereof can be obscured, and the first window 113c may be inserted into the recessed region of the first body 110 such that an end portion thereof can be obscured.

The first and second windows 113c and 123c may face each other in the closed configuration of the terminal, and disposed in parallel to each other in the open configuration. Referring to FIGS. 4A, 4B and 5A-5C, the first and second windows 113c and 123c may be disposed to be flush with each other in the open configuration.

The first and second windows 113c and 123c may be made of a material through which light is transmitted, for example, transparent synthetic resin, tempered glass and the like. Here, the first and second windows 113c and 123c may include portions through which light cannot be transmitted. Such portions may be made of a nontransparent material or surface-processed regions such that light cannot be transmitted.

A second display module 123d may be disposed at the rear case 122 to correspond to the window hole 123b. Accordingly, visual information output on the second display module 123d may externally be viewable. A first display module 113d may be disposed at the first body 110.

The first and second windows 113c and 123c and the first and second display modules 113d and 123d may be classified into first and second display units 113 and 123, respectively.

The first and second windows 113c and 123c may extend up to respective one ends of the first and second bodies 110 and 120 so as to be adjacent to each other in the open configuration.

Referring to FIG. 4A, the recessed regions 123a of the first and second bodies 110 and 120 may be defined by side surfaces thereof. Among the side surfaces of the first and second bodies 110 and 120, the side surfaces adjacent to each other in the open configuration are shown having open portions, namely, openings 123e. The first and second windows 113c and 123c may extend up to the openings 123e so as to configure dual displays adjacent to each other.

The driving unit 140 may be formed to obscure the second window 123c exposed from the opening 123e of the second body 120 and the first window 113c exposed from the opening of the first body 110. The driving unit 140 may include first and second cases 141 and 142. The second case 142 may has a first end cap 142a and a second end cap 142b. The first end cap 142a is configured to cover end portions of the first sides of the first and second body portions proximate the first ends of the first and second body portions. The second end cap 142b is configured to cover end portions of the second sides of the first and second body portions proximate the first ends of the first and second body portions. The first case 141 may be a case member. The case member is configured to link the first end cap 142a and the second end cap 142b and has a surface positioned parallel to and faces the first ends of the first and second body portion when the mobile terminal is in the closed configuration.

The first case 141 forms an appearance of the driving unit 140, and is formed in parallel to one ends of the first and second bodies 110 and 120 in the closed configuration. In detail, in the closed configuration, a principal surface of the first case 141 facing the first and second bodies 110 and 120 may be formed to obscure the one ends of the first and second bodies 110 and 120. The principal surface of the first case 141 may obscure the opening 123e of the second body 120 and the opening of the first body 110 in the closed configuration.

The second case 142 may be formed to intersect with the first case 141, and obscure end portions of the first and second bodies 110 and 120 which intersect with the one ends of the first and second bodies 110 and 120. In detail, the second case 142 may obscure the end portions of the first and second bodies 110 and 120, which are formed in the intersecting direction with the opening 123e of the second body 120 and the opening of the first body 110, respectively.

The thusly-structured driving unit 140 may be in the form of "[", for example. Both side surfaces facing each other may serve as the second case 142. The second case 142 may be perpendicular to the principal surface of the first case 141, and disposed to obscure both side surfaces of the first and second bodies 110 and 120. Accordingly, end portions of the first and second windows 113c and 123c can be protected, and a mobile terminal with a different design from the related art can be implemented.

The driving unit 140 may include rotation motion units 150 and slide motion units 160.

The rotation motion units 150 may include a first and second rotation motion units 150a and 150b. The rotation motion units 150 may be connected to each of the first and second bodies 110 and 120, and generate a relative rotation of the first and second bodies 110 and 120. The rotation motion units 150 may be mounted in the second case 142.

The rotation motion units 150 may generate the relative rotation of the first and second bodies 110 and 120, such that one surfaces of the first and second bodies 110 and 120 can be disposed in parallel to each other in the open configuration.

The second case 142 may include recess portions 143, in which the rotation motion units 150 are disposed. In the recess portions 143, the slide motion units 160 may be disposed to overlap the rotation motion units 150. The slide motion units 160 may include a first and second slide motion units 160a and 160b. A cover 144 for shielding each recess portion 143 may be mounted to the second case 142.

Referring to FIG. 4B, the second case 142 is shown having guide slot units 151. Both of first and second link members 152 and 153 may movably be coupled to each guide slot unit 151.

The first and second link members 152 and 153 may have one ends movable along the guide slot unit 151 and another ends coupled to the first and second bodies 110 and 120, respectively, by bolts, for example. This embodiment illustrates that the first and second link members 152 and 153 are coupled to the first and second bodies 110 and 120; however, the present invention may not be limited to this coupling. For example, the first and second link members 152 and 153 may be formed at the cases 111, 112, 121 and 122 (see FIG. 1) defining the outer appearances of the first and second bodies 110 and 120.

Rotation protrusions 152a and 153a and linear motion protrusions 152b and 153b may be formed at one ends of the first and second link members 152 and 153, respectively.

Each guide slot unit 151 may include rotation slots 154a and 155a and linear motion slots 154b and 155b. The rotation slots 154a and 155a may be connected to the rotation protrusions 152a and 153a, and arcuately formed so as to rotate one ends of the first and second link members 152 and 153. The linear motion slots 154b and 155b may be connected to the linear motion protrusions 152b and 153b, and linearly formed in radial directions of the rotation slots 154a and 155a. As shown in the drawings, the rotation protrusions 152a and 153a and the linear motion protrusions 152b and 153b may be movably inserted into the rotation slots 154a and 155a and the linear motion slots 154b and 155b.

Each of the rotation motion units 150 may include first and second connection links 156 and 157.

The first connection link 156 may be connected to the rotation protrusion 152a and the linear motion protrusion 152b of the first link member 152. The second link member 157 may have the same shape as that of the first connection link 156, and be connected to the rotation protrusion 153a and the linear motion protrusion 153b of the second link member 153. Referring to FIG. 4B, the first and second connection links 156 and 157 may be provided with a plurality of insertion grooves in which the rotation protrusions 152a and 153a and the linear motion protrusions 152b and 153b of the first and second link members 152 and 153 are inserted. With such configuration, the first and second connection links 156 and 157 may be rotatable.

Still referring to FIG. 4B, the driving unit 140 may further include connection members 158 each serving to connect the first and second connection links 156 and 157 to each other. The first and second connection links 156 and 157 may include connection member protrusion 156a and 157b, respectively, and the connection member 158 may include connection member slots 158a and 158b for guiding a linear movement of the connection member protrusions 156a and 157b. Each of the connection members 158 may be coupled to the first and second connection links 156 and 157, respectively, by coupling bolts to the connection member protrusions 156a and 157b which are inserted through the connection member slots 158a and 158b.

The connection member slots 158a and 158b may be formed as linear slots each extending in one direction, and formed in the same direction as the linear motion slots 154b and 155b. Accordingly, the first and second connection links 156 and 157 may be slidable along the connection member slots 158a and 158b.

Referring to FIGS. 4A and 4B, the slide motion units 160 may cooperate with the rotation motion units 150, and be configured to be relatively slidable with respect to the first and second bodies 110 and 120 between the closed and open configurations.

The slide motion units 160 may allow at least one of the first and second cases 141 and 142 to be relatively slidable with respect to the first and second bodies 110 and 120 between the closed and open configurations. The slide motion units 160 may be configured to be slidable in a direction perpendicular to the same flat surface (i.e., a surface on which the first and second windows are disposed in the open configuration, see FIG. 2) by virtue of the relative rotation of the first and second bodies 110 and 120.

Each of the slide motion units 160 may include guide wings 161 and guide rails 162.

The guide wings 161 may be formed at both ends of the connection member 158 which connects the first and second connection links 156 and 157. Each connection member 158 may be in the form of a plate, and the guide wings 161 may be edges of both side surfaces of the plate.

The guide rails 162 may be formed at the second case 142 of the driving unit 140, and engaged with the guide wings 161 so as to render the guide wings 161 guide the sliding of the connection member 158.

Hereinafter, an operation of the driving unit 140 will be described with reference to FIGS. 5A to 5C.

Figure 5A:
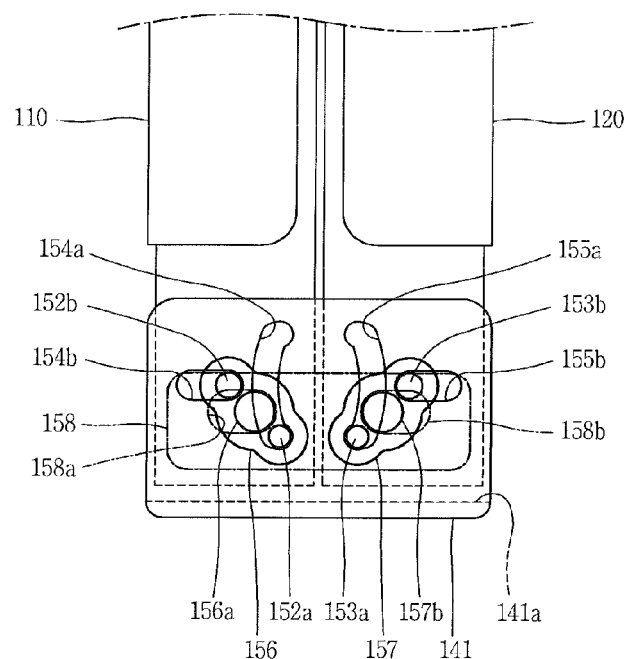
FIGS. 5A to 5C are overviews respectively illustrating an operation of the driving unit of FIG. 4.

As shown in FIG. 5A, the driving unit 140 may be formed to be symmetrical based upon one surfaces of the first and second bodies 110 and 120 facing each other in the closed configuration. The rotation protrusions 152a and 153a and the linear motion protrusions 152b and 153b may be located at positions biased to one ends of the rotation slots 154a and 155a and the linear motion slots 154b and 155b, respectively. The connection member 158 may be disposed adjacent to a principal surface 141a of the first case 141 which faces the first and the second bodies 110 and 120 in the closed configuration, and the connection member protrusions 156a and 157b may be located at positions biased to one ends of the connection member slots 158a and 158b.

Figure 5B:
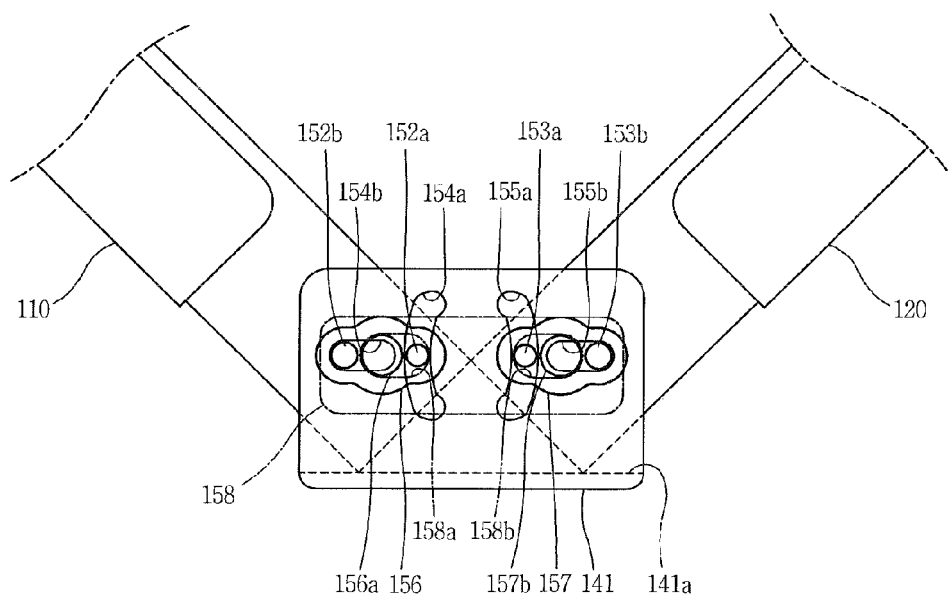

Referring to FIG. 5B, when the first and second bodies 110 and 120 are relatively rotated, the rotation protrusions 152a and 153a and the linear motion protrusions 152b and 153b are rotated along the rotation slots 154a and 155a and the linear motion slots 154b and 155b. Each of the rotation protrusions 152a and 153a is rotated along an arcuate path, and when the first and second bodies 110 and 120 are open by an angle of about 90°, they are located at the middle of the path. The linear motion protrusions 152b and 153b are slid away from each other, and when the first and second bodies 110 and 120 are open by an angle of about 90°, they are located at the farmost positions from each other within the slid path.

As shown in the drawings, the first and second connection links 156 and 157 are rotated based upon the connection member protrusions 156a and 157b by the combination of the rotational motion of the rotation protrusions 152a and 153a and the sliding motion of the linear motion protrusions 152b and 153b.

The driving unit 140 is configured to be moved in horizontal and longitudinal directions of the connection member protrusions 156a and 157b at the same time of the rotation thereof. This configuration can be realized by virtue of the sliding of the first and second connection links 156 and 157 which is made in a direction intersecting with the sliding direction of the connection member 158.

The one ends of the first and second bodies 110 and 120 then press the principal surface 141a of the first case 141 responsive to the relative rotation, and the connection member 158 is moved along the guide rail 162 (see FIG. 4B) responsive to the pressing. The connection member 158 is then slid, due to the relative rotation, in a direction perpendicular to one surfaces of the first and second bodies 110 and 120, which are in parallel to each other in the open configuration. At this time, the connection member protrusions 156a and 157b are slid in the same direction as the linear motion protrusions 152b and 153b being slid, along the connection member slots 158a and 158b. When the first and second bodies 110 and 120 are open by an angle of about 90°, the connection member protrusions 156a and 157b are disposed at the farmost positions from each other within the slid path.

Figure 5C:
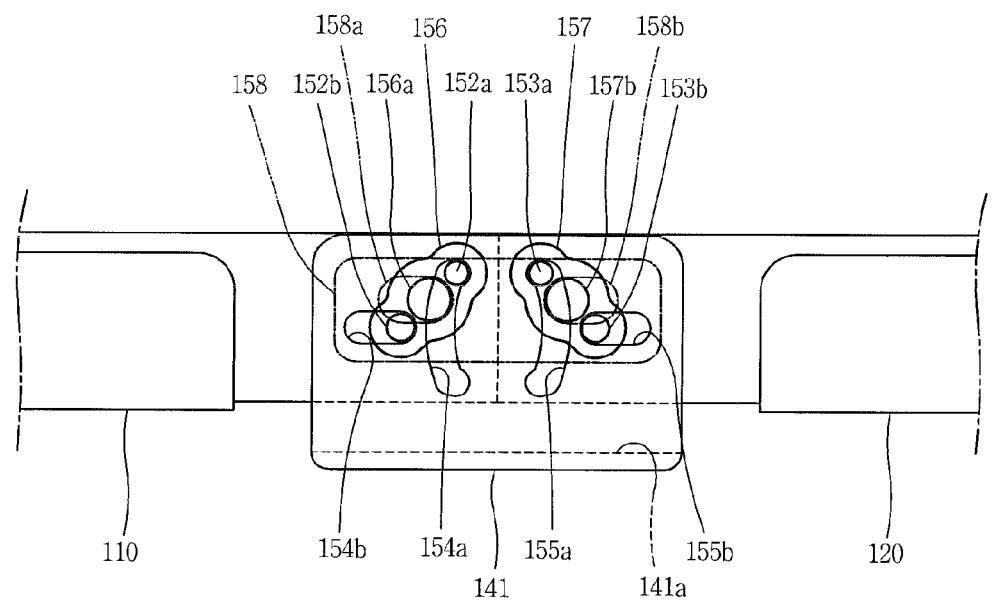

Referring to FIG. 5C, when the first and second bodies 110 and 120 are further relatively rotated over the angle of about 90° therebetween, the rotation protrusions 152a and 153a are moved toward another ends of the rotation slots 154a and 155a. The another ends of the rotation slots 154a and 155a may correspond to opposite ends to the one ends of the rotation slots, at which the rotation protrusions 152a and 153a were located in the closed configuration. Here, the linear motion protrusions 152b and 153b are moved toward one ends of the linear motion slots 154b and 155b, at which the linear motion protrusions 152b and 153b were located in the closed configuration, along the linear motion slots 154b and 155b.

The connection member 158 is moved along the guide rail 162, and the connection member protrusions 156a and 157b are moved towards one ends of the connection member slots 158a and 158b, at which the connection member protrusions 156a and the 157b were located in the closed configuration.

As described above, the relative rotation of the first and second bodies 110 and 120, which has the link connection structure other than a hinge coupling structure, can be realized by the combination of the rotational motion of the rotation protrusions 152a and 153a, the sliding motion of the linear motion protrusions 152b and 153b and the sliding motion of the connection member 158. Accordingly, more compact rotation mechanism can be implemented, and the terminal can be slimmer in thickness.

Figure 6:
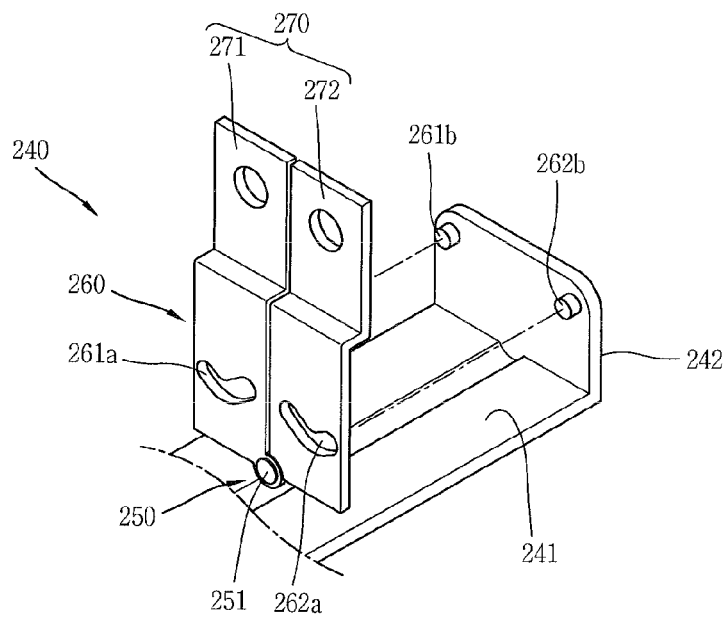
FIG. 6 is a disassembled view illustrating a variation of the driving unit of FIG. 4.

FIG. 6 is a disassembled view illustrating a variation of the driving unit of FIG. 4A, and FIGS. 7A to 7C are overviews respectively illustrating an operation of a driving unit 240 of FIG. 6.

Referring to FIG. 6, first and second bodies 210 and 220 may be connected to a driving unit 240 by connection units 270, respectively.

Each of the connection units 270 may include first and second connection members 271 and 272. The first connection member 271 may be connected to cases of the first body 210, and the second connection member 272 may be connected to cases of the second body 220.

Each of rotation motion units 250 partially configuring the driving unit 240 as one component may include a hinge unit 251. The hinge unit 251 may be formed between the first and second bodies 210 and 220 to allow hinge-coupling between the first and second bodies 210 and 220. Referring to FIG. 6, the hinge unit 251 may be configured to couple the first and second connection members 271 and 272 by a hinge. Accordingly, the first and second bodies 210 and 220 may be relatively rotated based upon a hinge shaft.

Each of slide motion units 260 partially configuring the driving unit 240 as one component may include guide slots 261a and 262a and guide protrusions 261b and 262b.

The guide slots 261a and 262a may be formed at the first and second bodies 210 and 220, respectively, and each may have an arcuate shape so as to allow the relative rotation of the first and second bodies 210 and 220. The guide protrusions 261b and 262b may be formed at case 242, which form an outer appearance of the driving unit 240, and inserted into the guide slots 261a and 262a. The guide slots 261a and 262a may be formed at the first and second connection members 271 and 272, respectively.

The cases 241 and 242 of the driving unit 240 may include a first case 241 and a second case 242.

The first case 241 may define the appearance of the driving unit 240, and be formed in parallel to one ends of the first and second bodies 210 and 220 in the closed configuration. In detail, the first case 241 may be configured such that a surface thereof facing the first and second bodies 210 and 220 in the closed configuration obscures one ends of the first and second bodies 210 and 220. Referring to FIG. 6, the guide protrusions 261b and 262b may be formed at the second case 242.

Figure 7A:
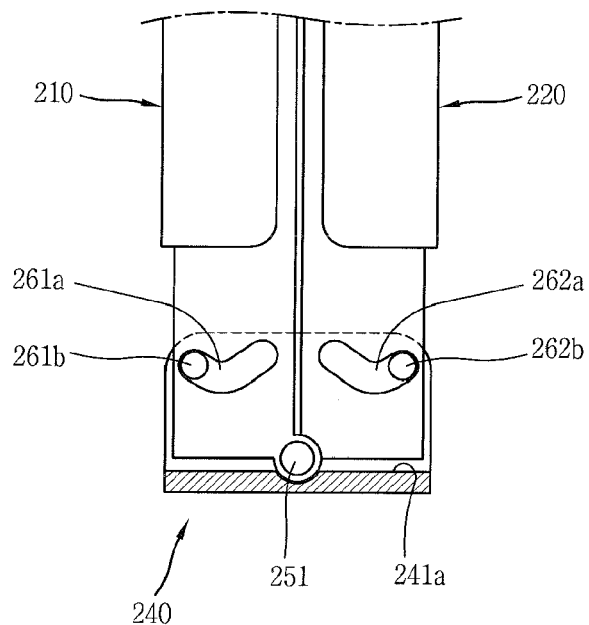
FIGS. 7A to 7C are overviews respectively illustrating an operation of the driving unit of FIG. 6.
Figure 7B:
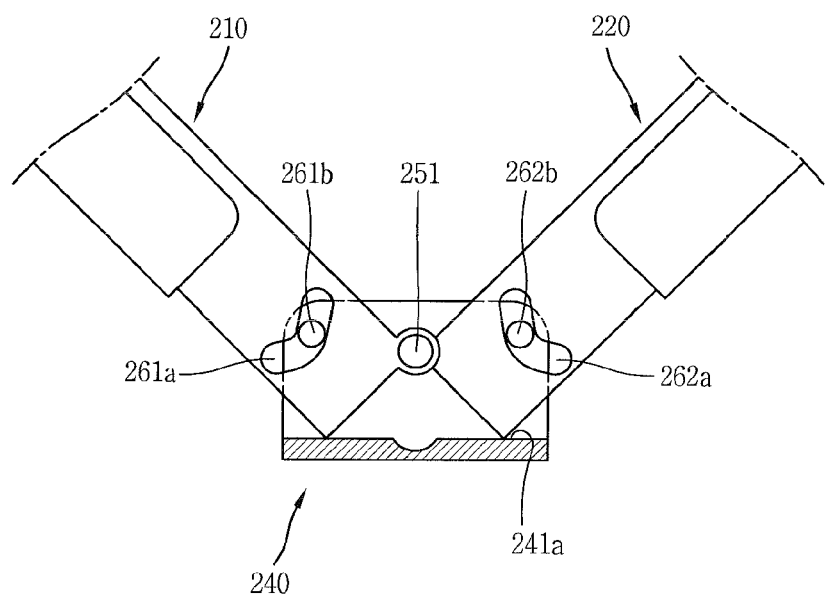
Figure 7C:
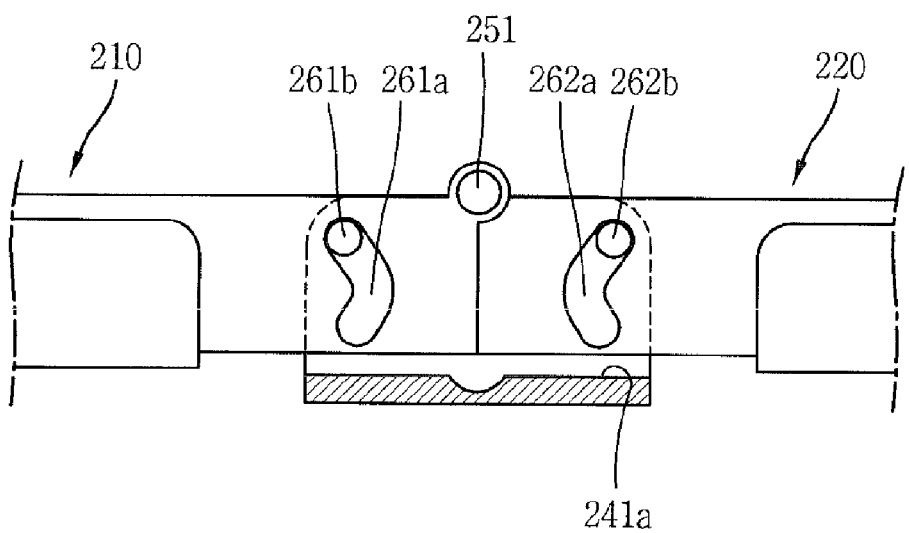

Referring to FIGS. 7A to 7C, the one ends of the first and second bodies 210 and 220 press a surface of the first case 241 (i.e., a principal surface 241a of the first case 241) facing the first and second bodies 210 and 220, and the guide protrusions 261b and 262b are moved along the guide slots 261a and 262a responsive to the pressing. Accordingly, the first and second bodies 210 and 220 may be slidable up and down based upon the driving unit 240 between the closed configuration and the open configuration.

Figure 8:
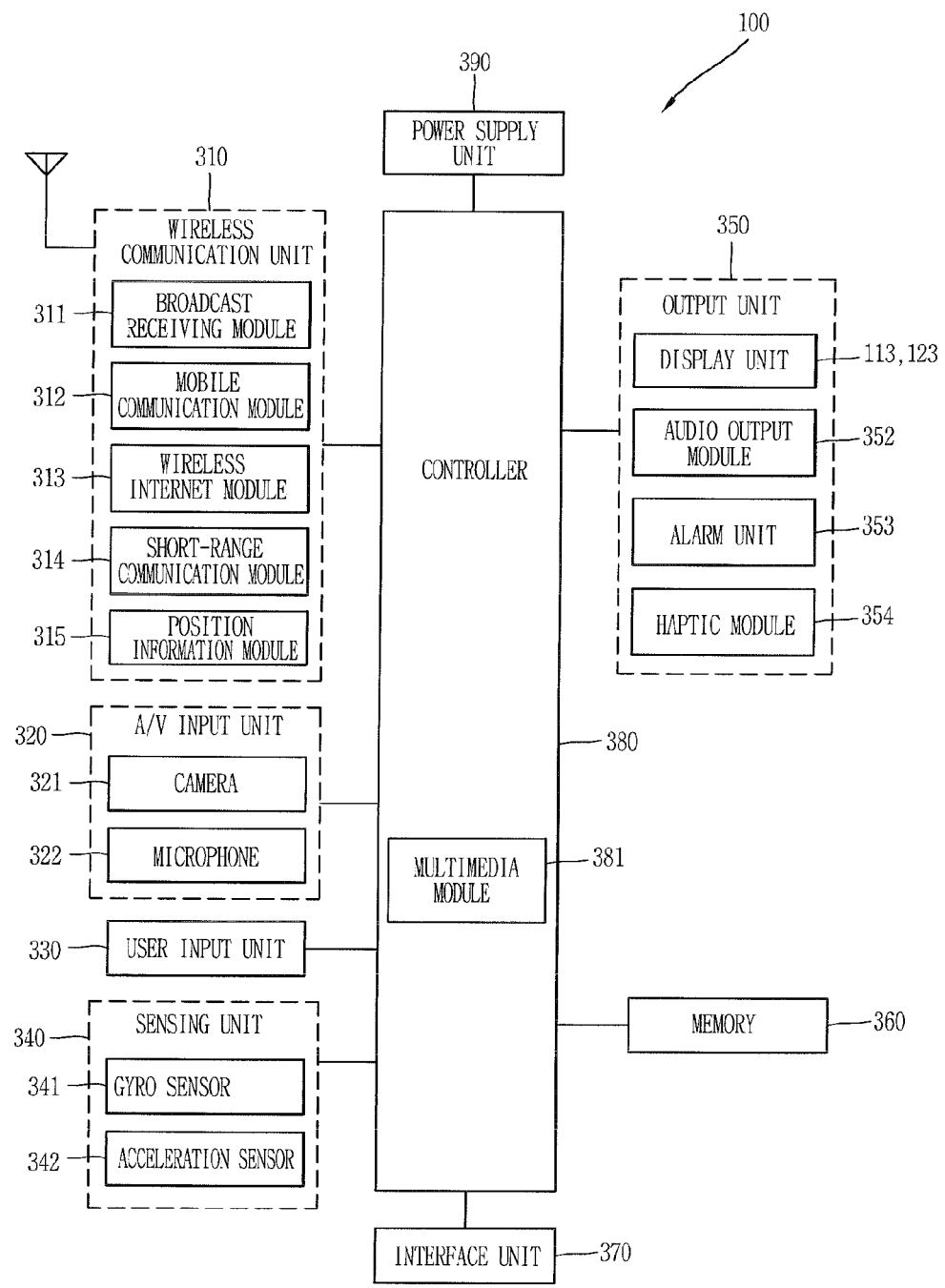
FIG. 8 is a block diagram of a mobile terminal in accordance with the present invention.

FIG. 8 is a block diagram of a mobile terminal in accordance with the present invention. Hereinafter, description will be given based upon the configuration of the mobile terminal 100 in accordance with the one embodiment of the present invention; however, the description can be applied to a mobile terminal 200 in accordance with another embodiment as it is, which will be fully inferred by a person skilled in the art.

Referring to FIG. 8, the mobile terminal 100 may include a wireless communication unit 310, an A/V (audio/video) input unit 320, a user input unit 330, a sensing unit 340, an output unit 350, a memory 360, an interface unit 370, a controller 380, a power supply unit 390 and the like. FIG. 8 shows the mobile terminal 100 having various components, but it is understood that implementing all of the illustrated components is not a requirement. Greater or fewer components may alternatively be implemented.

Hereinafter, each component is described in sequence.

The wireless communication unit 310 may typically include one or more components which permit wireless communications between the mobile terminal 100 and a wireless communication system or between the mobile terminal 100 and a network within which the mobile terminal 100 is located. For example, the wireless communication unit 310 may include a broadcast receiving module 311, a mobile communication module 312, a wireless internet module 313, a short-range communication module 314, a position information module 315 and the like.

The broadcast receiving module 311 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 312.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 311 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 311 may be configured to be suitable for every broadcast system transmitting broadcast signals as well as the digital broadcasting systems.

Broadcast signals and/or broadcast associated information received via the broadcast receiving module 311 may be stored in a suitable device, such as a memory 360.

The mobile communication module 312 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 313 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 314 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position information module 315 denotes a module for detecting or calculating a position of a portable terminal. An example of the position location module 115 may include a Global Position System (GPS) module.

The A/V input unit 320 is configured to provide audio or video signal input to the mobile terminal. The A/V input unit 320 may include a camera 321 and a microphone 322. The camera 321 receives and processes image frames of still pictures or video obtained by image sensors in a video (telephony) call mode or a capturing mode. The processed image frames may be displayed on display units 113 and 123.

The image frames processed by the camera 321 may be stored in the memory 360 or transmitted to the exterior via the wireless communication unit 310. Two or more cameras 321 may be provided according to the configuration of the mobile terminal.

The microphone 322 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 312 in case of the phone call mode. The microphone 322 may include assorted noise removing algorithms to remove noise generated in the course of receiving the external audio signal.

The user input unit 330 may generate input data input by a user to control the operation of the mobile terminal. The user input unit 330 may include a keypad, a dome switch, a touchpad (e.g., static pressure/capacitance), a jog wheel, a jog switch and the like. In the present invention, the user input unit 330 may be used as a device for receiving a grouping command.

The sensing unit 340 provides status measurements of various aspects of the mobile terminal. For instance, the sensing unit 340 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 340 may sense whether a sliding portion of the mobile terminal is open or closed. Other examples include sensing functions, such as the sensing unit 340 sensing the presence or absence of power provided by the power supply unit 329, the presence or absence of a coupling or other connection between the interface unit 370 and an external device and the like. Moreover, the sensing unit 140 may include a gyro sensor 341 and an acceleration sensor 342.

The output unit 350 is configured to output an audio signal, a video signal or an alarm signal. The output unit 350 may include display units 113 and 123, an audio output module 352, an alarm unit 353, a haptic module 354 and the like.

The display units 113 and 123 may output information processed in the mobile terminal 100. For example, when the mobile terminal is operating in a phone call mode, the display units 113 and 123 will provide a User Interface (UI) or a Graphic User Interface (GUI) which includes information associated with the call. Also, the display units 113 and 123 may display various menus and items stored in the memory 360 of the mobile terminal 100. As another example, if the mobile terminal is in a video call mode or a capturing mode, the display unit 151 may additionally or alternatively display images captured and/or received, UI, or GUI.

The display units 113 and 123 may be implemented using at least one of, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display units 113 and 123 may also be implemented to be optically transparent. Under this configuration, a user can view an object positioned at a rear side of a terminal body through a region occupied by the display units 113 and 123 of the terminal body.

The display units 113 and 123 may be implemented in two or more in number according to a configured aspect of the mobile terminal 100. For instance, a plurality of the display units may be arranged on one surface to be spaced apart from or integrated with each other, or may be arranged on different surfaces.

Here, if the display units 113 and 123 and a touch sensitive sensor (referred to as a 'touch sensor') have a layered structure therebetween, the structure may be referred to as 'touch screen'. In this structure, the display units 113 and 123 may be used as an input device rather than an output device. The touch sensor may be implemented as a touch film, a touch sheet, a touch pad, and the like.

The touch sensor may be configured to convert changes of a pressure applied to a specific part of the display units 113 and 123, or a capacitance occurring from a specific part of the display units 113 and 123, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 380. Accordingly, the controller 380 may sense which region of the display units 113 and 123 has been touched.

The audio output module 352 may output audio data received from the wireless communication unit 310 or stored in the memory 160, in a call-receiving mode, a call-placing mode, a recording mode, a voice recognition mode, a broadcast reception mode, and so on. The audio output module 352 may output audio signals relating to functions performed in the mobile terminal 100, e.g., sound alarming a call received or a message received, and so on. The audio output module 352 may include a receiver, a speaker, a buzzer, and so on.

The alarm unit 353 outputs signals notifying occurrence of events from the mobile terminal 100. The events occurring from the mobile terminal 100 may include call received, message received, key signal input, touch input, and so on. The alarm unit 353 may output not only video or audio signals, but also other types of signals such as signals notifying occurrence of events in a vibration manner. Since the video or audio signals can be output through the display units 113 and 123 or the audio output module 352, the display units 113 and 123 and the audio output module 352 may be categorized into a part of the alarm unit 353.

The haptic module 354 generates various tactile effects which a user can feel. A representative example of the tactile effects generated by the haptic module 354 includes vibration. Vibration generated by the haptic module 354 may have a controllable intensity, a controllable pattern, and so on. For instance, different vibration may be output in a synthesized manner or in a sequential manner.

The haptic module 354 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The memory 360 may store a program for the processing and control of the controller 380. Alternatively, the memory 360 may temporarily store input/output data (e.g., phonebook data, messages, still images, video and the like). Also, the memory 360 may store data related to various patterns of vibrations and audio output upon the touch input on the touch screen.

The memory 360 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 360 on the Internet.

The interface unit 370 may generally be implemented to interface the mobile terminal with external devices. The interface unit 370 may allow a data reception from an external device, a power delivery to each component in the mobile terminal 100, or a data transmission from the mobile terminal 100 to an external device. The interface unit 370 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 370 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 380 typically controls the overall operations of the mobile terminal 100. For example, the controller 380 performs the control and processing associated with telephony calls, data communications, video calls, and the like. The controller 380 may include a multimedia module 381 which provides multimedia playback. The multimedia module 381 may be configured as part of the controller 380 or as a separate component.

The controller 380 can perform a pattern recognition processing so as to recognize writing or drawing input on the touch screen as text or image.

The power supply unit 329 provides power required by various components under the control of the controller 380. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 380.

For software implementation, the embodiments such as procedures and functions may be implemented together with separate software modules each of which performs at least one of functions and operations. The software codes can be implemented with a software application written in any suitable programming language. Also, the software codes may be stored in the memory 360 and executed by the controller 380.

Hereinafter, an image displaying method according to the present invention will be described with reference to FIG. 9.

Figure 9:
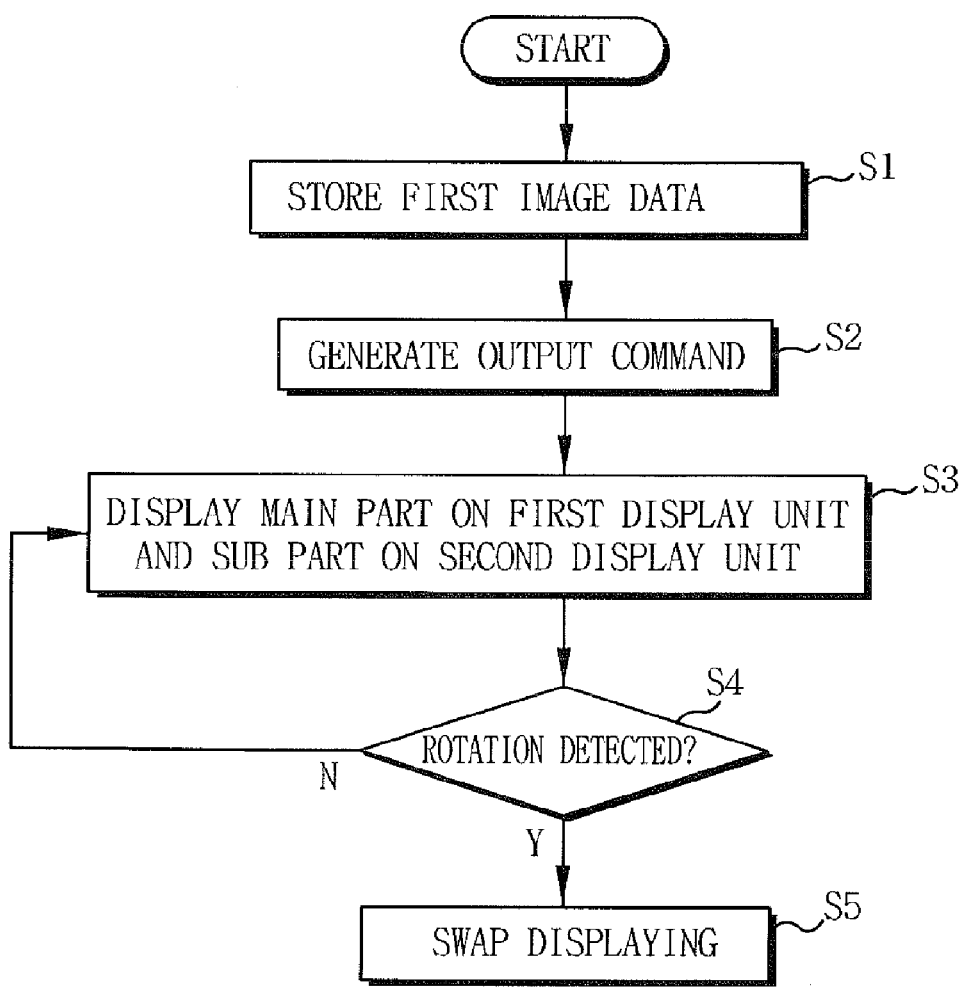
FIG. 9 is a flowchart illustrating an image displaying method in accordance with one embodiment of the present invention.

FIG. 9 is a flowchart illustrating an image displaying method in accordance with one embodiment of the present invention.

As shown in FIG. 9, first image data is stored in the memory 360 (S1). Examples of the first image data may include an image captured by the camera 321, image data obtained from the interface unit 370, webpage image and the like. A user generates an output command through the user input unit 330 such that the first image data is output on the display units 113 and 123 (see FIG. 8) (S2). According to the output command, a main part of the first image data is output on the first display unit 113, and a sub part of the first image data is output on the second display unit 123 (S3). Under this state, when the user rotates the mobile terminal 100, the sensing unit 340 detects the rotation (S4). As aforementioned, the sensing unit 340 for detecting the rotation may include at least one of the gyro sensor 341 and the acceleration sensor 342. When the rotation of the mobile terminal 100 is detected by the sensing unit 340, the first image data is rotated to be displayed over the first and second display units 113 and 123 (S5) (swap displaying). Here, the first image data may be shifted to the first display unit 113 so as to be displayed. A control menu, information related to the first image data or second image data may be displayed on a sub part non-displayed region of the second display unit 123 on which the sub part of the first image data is output, which will be described later in detail with reference to FIG. 12.

Figure 15:
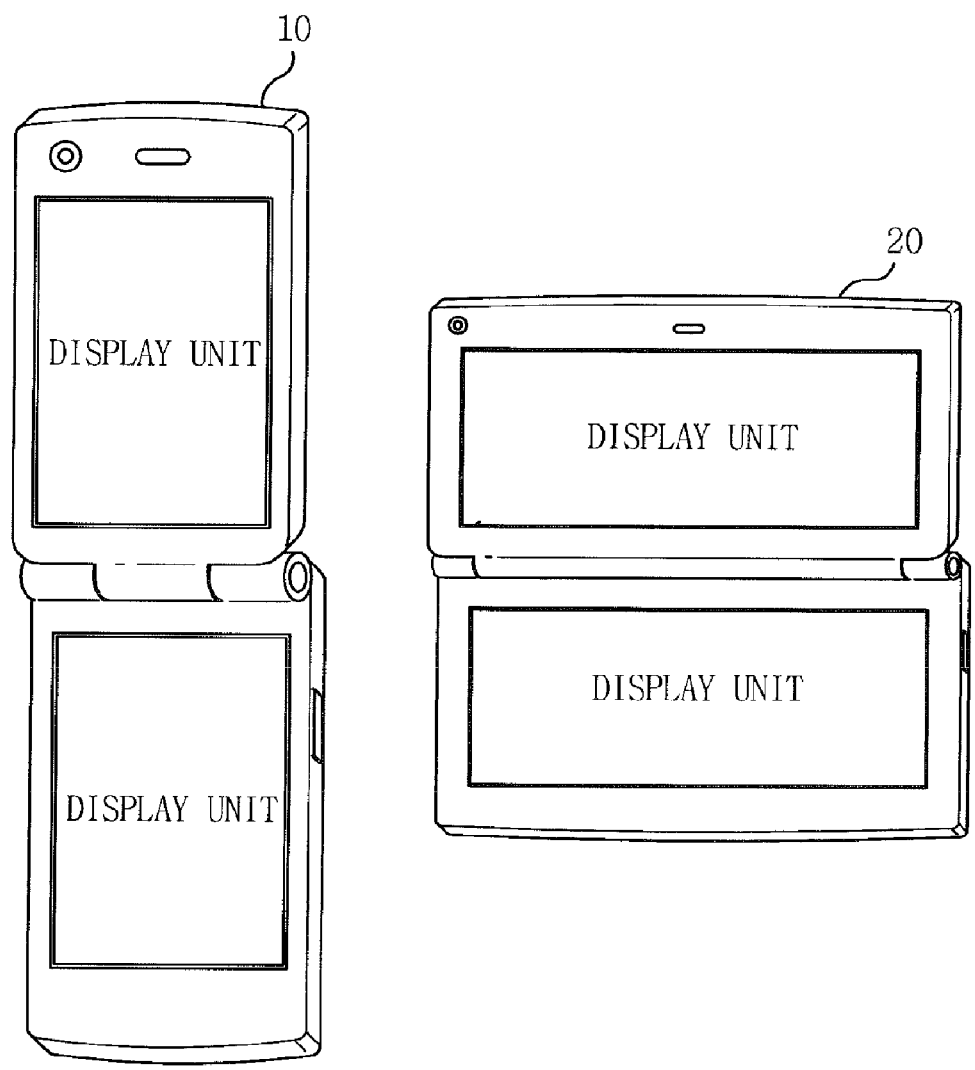
FIG. 15 is a schematic view of a mobile terminal to which the image displaying method according to the one embodiment of the present invention is to be applicable.

Hereinafter, description will be given of an example in which the image displaying method according to the present invention is applied to the same type of a mobile terminal as the mobile terminal 100 having described in FIGS. 1 to 3. However, the image displaying method according to the present invention may not be limited to the embodiment, but applicable to various types of mobile terminals as shown in FIG. 15.

Hereinafter, description will be given of the detailed example in which the image displaying method as one embodiment of the present invention having described with reference to FIG. 9 is applied to a mobile terminal.

Figure 10A:
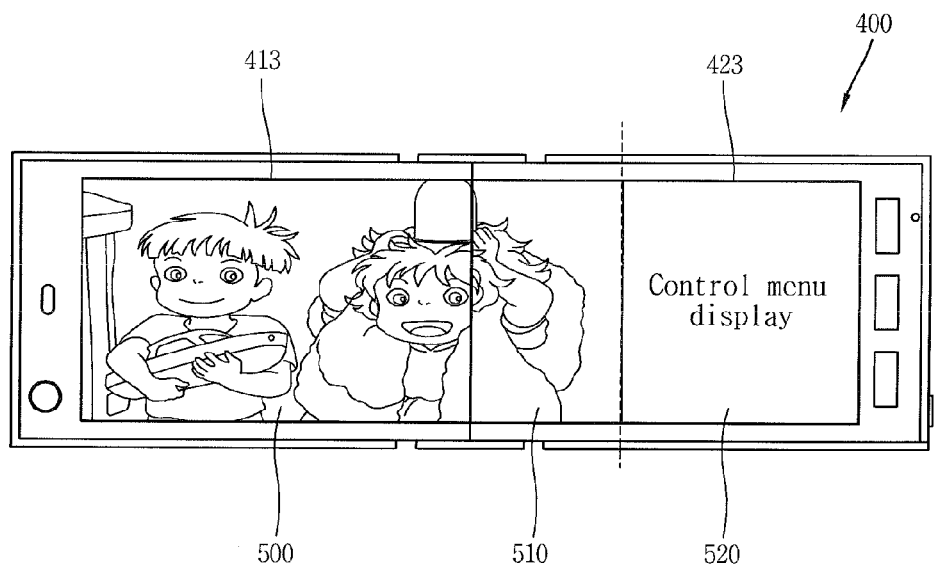
FIGS. 10A and 10B are image views of a mobile terminal adapting the image displaying method in accordance with the one embodiment of the present invention.
Figure 10B:
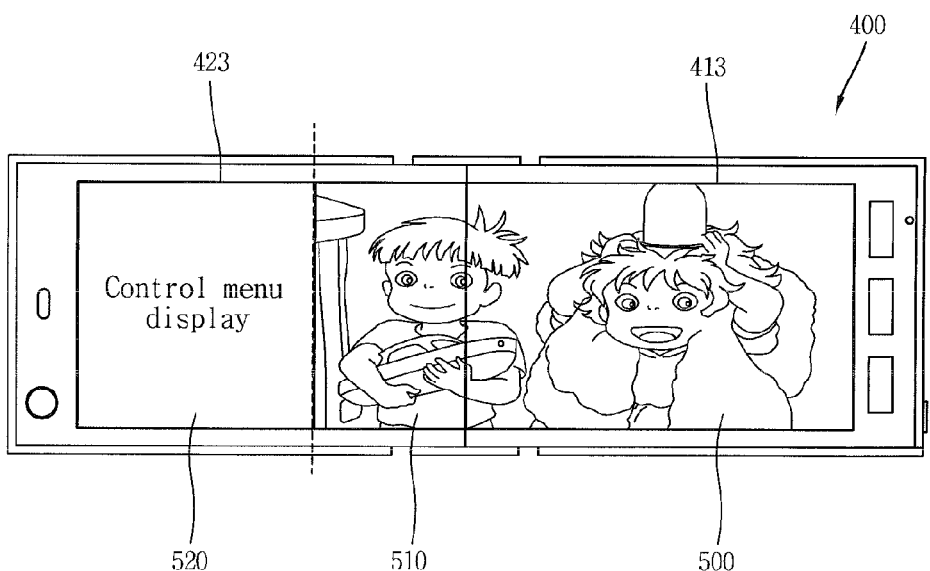
Figure 13A:
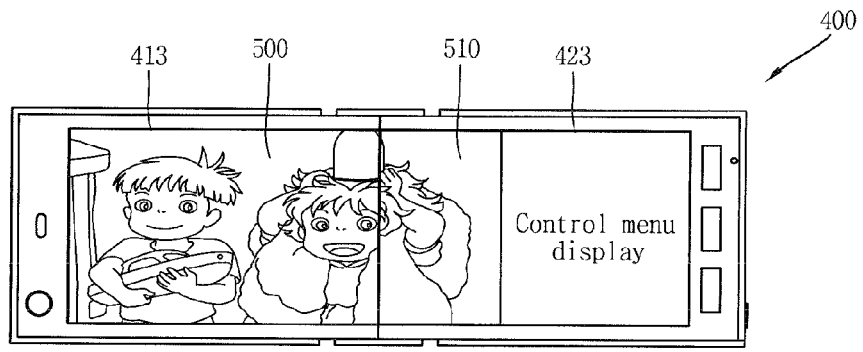
FIGS. 13A to 13D are image views illustrating a first image control method upon detection of a rotation in the mobile terminal adapting the image displaying method in accordance with the one embodiment of the present invention.
Figure 13B:
Figure 13C:
Figure 13D:
Figure 14A:
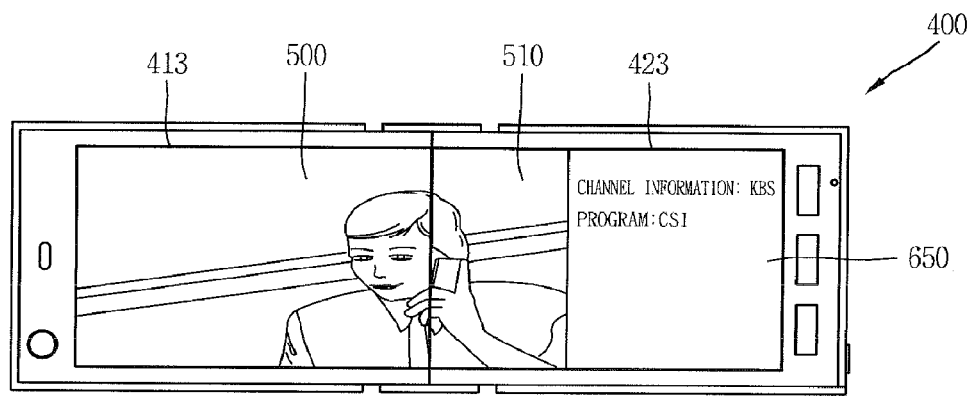
FIGS. 14A to 14C are image views illustrating a second image control method upon detection of a rotation in the mobile terminal adapting the image displaying method in accordance with the one embodiment of the present invention.
Figure 14B:
Figure 14C:

FIGS. 10A and 10B are image views of a mobile terminal 400 adapting the image displaying method in accordance with the one embodiment of the present invention, FIGS. 11A to 11L are image views illustrating various applications for a control menu display unit in the mobile terminal 400 adapting the image displaying method in accordance with the one embodiment of the present invention, FIG. 12 is an image view illustrating an example of changing a size of an image in the mobile terminal 400 adapting the image displaying method in accordance with the one embodiment of the present invention, FIGS. 13A to 13D are image views illustrating a first image control method upon detection of a rotation in the mobile terminal 400 adapting the image displaying method in accordance with the one embodiment of the present invention, and FIGS. 14A to 14C are image views illustrating a second image control method upon detection of a rotation in the mobile terminal 400 adapting the image displaying method in accordance with the one embodiment of the present invention.

Referring to FIGS. 10A and 10B, a mobile terminal 400 according to the present invention may include a first display unit 413 and a second display unit 423. When a user desires to output first image data on the display units 413 and 423 through a user input unit 330 (see FIG. 8), as shown in FIG. 10A, the first display unit 413 displays a main part 500 of the first image data, and the second display unit 423 displays a sub part 510 of the first image data and a control menu 520. It can be noticed that the main part 500 and the sub part 510 are combined to complete the first image data. Under this state, when the user rotates the mobile terminal 400, the rotation is detected by the sensing unit 340 (see FIG. 8). According to a rotation detection signal generated from the sensing unit 340, the sub part 510 is rotated on the second display unit 423 to be displayed thereon and the main part 500 is rotated on the first display unit 413 to be displayed thereon (see FIG. 10B). That is, from the user's perspective, it can be viewed that the first image data is displayed by being shifted to the right display unit. Namely, when the mobile terminal 400 is rotated by an angle of 180°, the control menu 520 is shifted from a left side to a right side, accordingly, the first image data is moved to the right side. The present invention may not be limited to the configuration, and it can be obvious to a person skilled in the art that the control menu 520 may be fixed to the right side.

Various examples of the control menu 520 may be embodied, which will be described in detail with reference to FIG. 11A to 11L.

FIG. 11A to 11L are image views illustrating various applications for a control menu display unit in the mobile terminal 400 adapting the image displaying method in accordance with the one embodiment of the present invention.

Figure 11A:
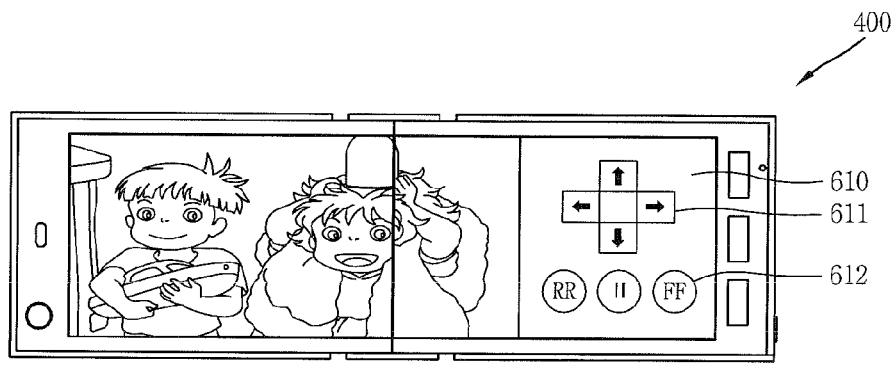
FIGS. 11A to 11L are image views illustrating various applications for a control menu display unit in the mobile terminal adapting the image displaying method in accordance with the one embodiment of the present invention.
Figure 11B:
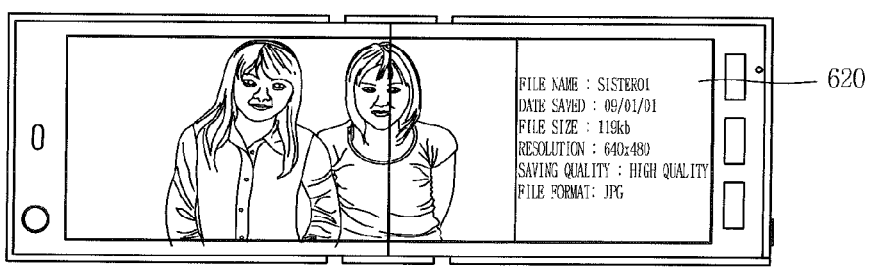
Figure 11C:
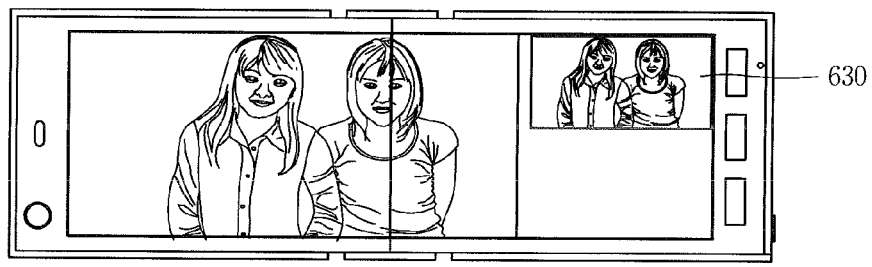
Figure 11D:

FIG. 11A shows that a navigation/function key 610 including navigation keys 611 and function keys 612 is displayed on a control menu region. A user can perform functions, such as channel change, volume control, screen pause and the like on digital broadcasts through the navigation/function key 610. FIG. 11B shows that photo/video information 620 is displayed on the control menu region. That is, when the first image data is data obtained by the camera 321 (see FIG. 8), the user can obtain information relating to the currently displayed image through the photo/video information 620. The information may include a file size, a file name, resolution, a file format and the like. FIG. 11C shows that a thumbnail image 630 of the first image data is displayed on the control menu region. If the first image data displayed on the display units zooms in or the first image data is displayed with being distorted (due to an image quality compensation and the like), the original image of the first image data is displayed by use of the thumbnail image 630, thereby achieving user's convenience. FIG. 11D shows that a phone input key 640 is displayed on the control menu region. A user can execute phone-related functions, such as a call connection, a text message transmission and the like, through the phone input key 640 while viewing the first image data.

Figure 11E:
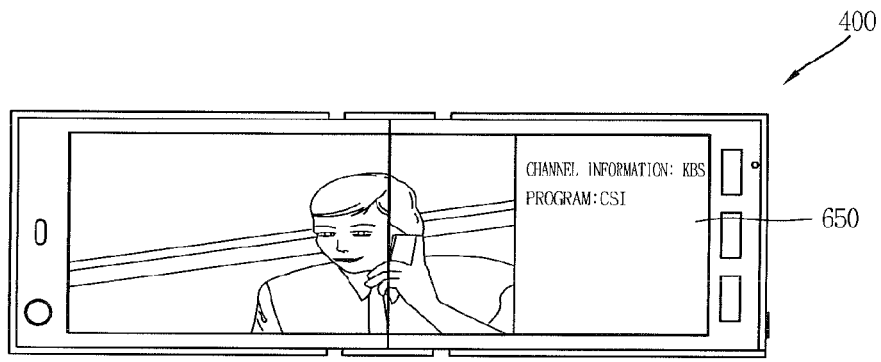
Figure 11F:
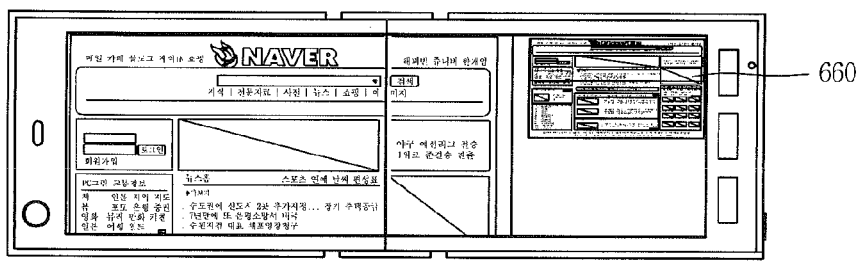
Figure 11G:
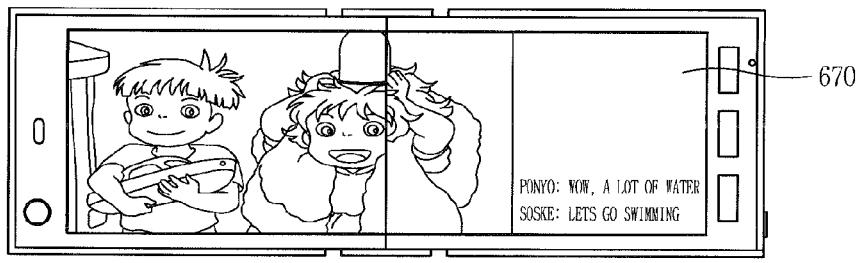
Figure 11H:
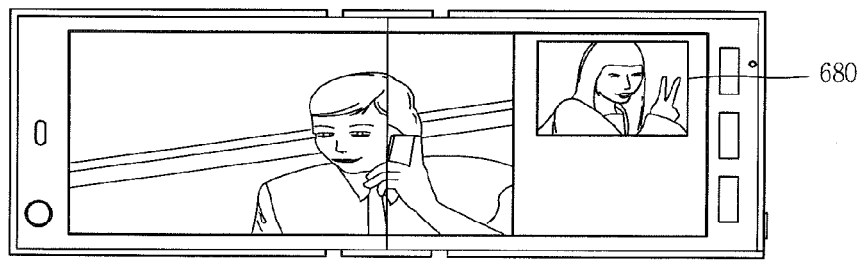

FIG. 11E shows that broadcast-related information 650 is displayed on the control menu region. A user can view the broadcast-related information 650 simultaneously with a digital broadcast. The broadcast-related information 650 may be extracted from EPG data to be displayed. FIG. 11F shows that a mini-map 660 of a webpage is displayed on the control menu region. The mini-map allows confirmation of a position of a webpage which is currently displayed on the first and second display units. FIG. 11G shows that subtitle information 670 relating to a video is displayed on the control menu region. This example allows a user to view the video without interruption of subtitle. FIG. 11H shows that another broadcast channel (PIP channel) 680 is displayed on the control menu region. A user can watch a first broadcast and simultaneously watch a second broadcast (PIP channel) displayed on the control menu region, through the first and second display units 413 and 423.

Figure 11I:
Figure 11J:
Figure 11K:
Figure 11L:
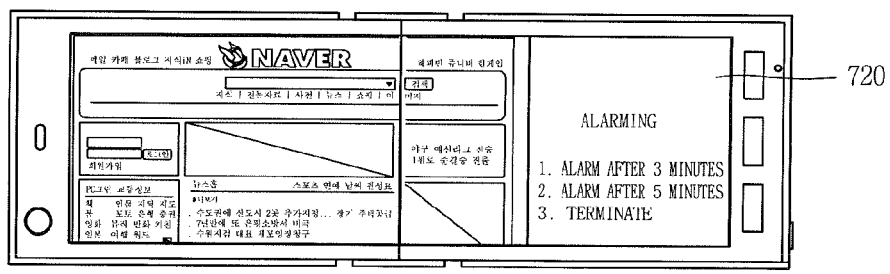

FIG. 11I shows that text message information 690 is displayed on the control menu region. According to the example, a user can check a received message through the control menu region while watching a video. FIG. 11J shows that a main image is a still image such as a photo and a thumbnail list 700 of other photos within a folder, to which the main image is stored, is displayed on the control menu region. According to the example, a user can easily view other photos within the folder. It is obvious that this example may also be applied for video. FIG. 11K shows a case of receiving a call during video watching. A message 710 indicating a call received is displayed on the control menu region. According to the example, a user can check the call being received through the control menu region without interruption of the video watching. FIG. 11L shows that alarm information 720, such as alarm, morning call, schedule and the like, is displayed on the control menu region. According to the example, a user can check the alarm information while watching a video.

FIG. 12 is an image view illustrating an example of changing a size of an image in the mobile terminal adapting the image displaying method in accordance with the one embodiment of the present invention. FIG. 12 shows a mobile terminal including a first display unit 413 and a second display unit 423. The first display unit 413 displays an image 800, and a size guide icon 801 at one side of the image 800. The size guide icon 801 may be generated, for example, by touching an edge of the image 800 or by an input signal through the user input unit 330 (see FIG. 8). Under this state, if a user selects the size guide icon 801 and then drags the same toward the second display unit 423, as shown in FIG. 12, the image 800 is enlarged to the second display unit 423. This embodiment illustrates the size enlargement of the image by virtue of the dragging; however, the size enlargement of the image may automatically be performed merely by the selection of the size guide icon 801. Also, the image enlargement by the dragging may be executed by fixing a screen output rate or by adjusting the screen output rate. If the image is enlarged in size by adjusting the screen output rate, a distortion of the screen may occur but a non-displayed portion of the image may not be generated.

FIG. 13A to 13D are image views illustrating a first image control method upon detection of a rotation in the mobile terminal adapting the image displaying method in accordance with the one embodiment of the present invention. As shown in FIG. 13A, a main part 500 of image data is displayed on the first display unit 413 and a sub part 510 of the image data is displayed on the second display unit 423. Under this state, when a user rotates the mobile terminal 400 (e.g., rotating by an angle of)180°, the sensing unit 340 (see FIG. 8) detects the rotation. The image data is accordingly swapped such that the user can view a normal screen. Simultaneously, the image is paused so as to be displayed in the paused state and the received image data (e.g., broadcast data) is stored. If the image data being displayed is image data stored in the memory 360 (see FIG. 8), the reproduction of the image is merely paused (see FIG. 13B). Afterwards, in order for the user to view a portion which is hard to be seen during rotation, upon the generation of the rotation detection signal, the controller 380 executes a rewind function from the paused image at a five-second interval (see FIG. 13C), and then executes a fast forward function for the image at another five-second interval (see FIG. 13D). According to the example, even if the user rotates the mobile terminal 400, image data which may be missed during rotation can be checked later. This example has illustrated the operation according to the rotation detection signal. However, the present invention may not be limited to the operation; but such function may be executed even if a folder is folded or unfolded over a preset angle.

FIGS. 14A to 14C are image views illustrating a second image control method upon detection of a rotation in the mobile terminal adapting the image displaying method in accordance with the one embodiment of the present invention.

As shown in FIG. 14A, the main part 500 of the image data is displayed on the first display unit 413 and the sub part 510 of the image data is displayed on the second display unit 423. Under this state, when the user rotates the mobile terminal 400 (e.g., rotating by an angle of 180°), the sensing unit 340 (see FIG. 8) detects the rotation. The image data is accordingly swapped such that the user can view a normal screen. Simultaneously, the image is paused so as to be displayed in the paused state and the received image data (e.g., broadcast data) is stored. If the image data being displayed is image data stored in the memory 360 (see FIG. 8), the reproduction of the image is merely paused (see FIG. 14B). Afterwards, in order for the user to view a portion which is hard to be seen during rotation, upon the generation of the rotation detection signal, the controller 380 keeps recording the received image data while restarting the reproduction from the paused image (see FIG. 14C). According to the example, even if the user rotates the mobile terminal 400, image data which may be missed during rotation can be checked later. This example has illustrated the operation according to the rotation detection signal. However, the present invention may not be limited to the operation; but such function may be executed even if a folder is folded or unfolded over a preset angle.

Figure 16:
FIG. 16 is a schematic view illustrating a case where the image displaying method according to the one embodiment is applied to the mobile terminal of FIG. 15.

FIG. 15 is a schematic view of a mobile terminal to which the image displaying method according to the one embodiment of the present invention is to be applicable. 10 denotes a typical folder type mobile terminal which has longitudinally long display units. 20 denotes a horizontally long mobile terminal, which is frequently applied to smart-phones. Also, the types of the mobile terminals applied to FIG. 15 are merely illustrative, and thus are not to be construed as limiting the present invention. FIG. 16 is a schematic view illustrating a case where the image displaying method according to the one embodiment is applied to the mobile terminal 10 of FIG. 15.

A mobile terminal in accordance with at least one embodiment of the present invention with such configuration may have dual display units, which are disposed at adjacent positions in parallel to each other by virtue of a driving unit located at a side surface of first and second bodies. Also, the present invention can implement a slimmer rotation mechanism due to a relative sliding of the first and second bodies with respect to the driving unit.

In addition, the present invention can implement a driving unit thinner in thickness by an employment of guide slot units, which allow a different design for a mobile terminal from the related art mobile terminal.

Furthermore, according to the present invention with the configuration, a user can be provided with a wider screen by use of two display units, thereby easily obtaining more information.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
  a first body portion having a first end of the first body portion, a second end of the first body portion, a first side of the first body portion, a second side of the first body portion and a first face of the first body portion;
  a second body portion having a first end of the second body portion, a second end of the second body portion, a first side of the second body portion, a second side of the second body portion and a first face of the second body portion; and a unit configured to rotatably couple the first end of the first body portion to the first end of the second body portion, in order to enable the mobile terminal to transition between a closed configuration and an open configuration, wherein the first face of the first body portion and the first face of the second body portion face each other when the mobile terminal is in the closed configuration with the first side of the first body portion positioned proximate the first side of the second body portion and the second side of the first body portion positioned proximate the second side of the second body portion, wherein the first face of the first body portion and the first face of the second body portion are rotated away from each other when the mobile terminal is in the open configuration, wherein the unit comprises:
 a first rotation motion unit coupled to each of the first and second body portions proximate the first side of each of the first and second body portions;
 a second rotation motion unit coupled to each of the first and second body portions proximate the second side of each of the first and second body portions;
 a first slide motion unit configured to cooperatively operate with the first rotation motion unit;
 a second slide motion unit configured to cooperatively operate with the second rotation motion unit;
 a first end cap configured to cover end portions of the first sides of the first and second body portions proximate the first ends of the first and second body portions;
 a second end cap configured to cover end portions of the second sides of the first and second body portions proximate the first ends of the first and second body portions; and
 a case member configured to link the first end cap and the second end cap and having a surface positioned parallel to and facing the first ends of the first and second body portion when the mobile terminal is in the closed configuration, wherein the first and second rotation motion units are configured to enable rotational movement between the first and second body portions during transitioning between the closed configuration and the open configuration, wherein the first and second slide motion units are configured to slide the first and second body portions with respect to the unit during transitioning between the closed configuration and the open configuration, wherein the first rotation motion unit comprises:
 a first guide slot unit formed in the first end cap;
 a first link member having a first end portion of the first link member movable along the first guide slot unit and a second end portion of the first link member coupled to the first body portion; and
 a second link member having a first end portion of the second link portion movable along the first guide slot unit and a second end portion of the second link member coupled to the second body portion, and wherein the second rotation motion unit comprises:
a second guide slot unit formed in the second end cap;
a third link member having a first end portion of the third link member movable along the second guide slot unit and a second end portion of the third link member coupled to the first body portion; and
 a fourth link member having a first end portion of the fourth link member movable along the second guide slot unit and a second end portion of the fourth link member coupled to the second body portion.

2. The mobile terminal of claim 1, wherein:
each of the first, second, third and fourth link members comprises a rotation protrusion and a linear motion protrusion formed at the first end portion of the corresponding link member;
the first guide slot unit comprises:
 a first rotation slot coupled to the rotation protrusion of the first link member, the first rotation slot having an arcuate shape;
 a second rotation slot coupled to the rotation protrusion of the second link member, the second rotation slot having an arcuate shape;
 a first linear motion slot coupled to the linear motion protrusion of the first link member and formed in a radial direction of the first rotation slot; and
 a second linear motion slot coupled to the linear motion protrusion of the second link member and formed in a radial direction of the second rotation slot; and
the second guide slot unit comprises:
 a third rotation slot coupled to the rotation protrusion of the third link member, the third rotation slot having an arcuate shape;
 a fourth rotation slot coupled to the rotation protrusion of the fourth link member, the fourth rotation slot having an arcuate shape;
 a third linear motion slot coupled to the linear motion protrusion of the third link member and formed in a radial direction of the third rotation slot; and
 a fourth linear motion slot coupled to the linear motion protrusion of the fourth link member and formed linearly in a radial direction of the fourth rotation slot.

3. The mobile terminal of claim 2, wherein:
the first rotation motion unit comprises:
 a first connection link coupled to the rotation protrusion and the linear motion protrusion of the first link member; and
 a second connection link coupled to the rotation protrusion and the linear motion protrusion of the second link member, the second connection link having a same shape as the first connection link; and
the second rotation motion unit comprises:
 a third connection link coupled to the rotation protrusion and the linear motion protrusion of the third link member; and
 a fourth connection link coupled to the rotation protrusion and the linear motion protrusion of the fourth link member, the fourth connection link having a same shape as the third connection link.

4. The mobile terminal of claim 3, wherein each of the first, second, third and fourth connection links comprises a first aperture for receiving the rotation protrusion of the corresponding first, second, third or fourth link member and a second aperture for receiving the linear motion protrusion of the corresponding link member.

5. The mobile terminal of claim 3, wherein the unit further comprises:
 a first connection member configured to couple the first connection link to the second connection link; and
 a second connection member configured to couple the third connection link to the fourth connection link.

6. The mobile terminal of claim 5, wherein:
each of the first, second, third and fourth connection links comprises a connection member protrusion;

the first connection member comprises a first connection member slot and a second connection member slot configured to guide linear motions of the connection member protrusions of the first and second connection links; and the second connection member comprises a third connection member slot and a fourth connection member slot configured to guide linear motions of the third and fourth connection member protrusions of the third and fourth connection links.

7. The mobile terminal of claim 6, wherein the first, second, third and fourth connection member slots are formed parallel to the corresponding first, second, third or fourth linear motion slot.

8. The mobile terminal of claim 5, wherein:

each of the first and second connection members further comprises first and second ends with a first and second guide wing formed at the corresponding first and second end; and each of the first and second end caps comprises guide rails configured to engage the first and second guide wings of the corresponding first and second connection members for guiding sliding movement of the first and second connection members during transitioning between the open and closed configurations of the mobile terminal.

9. The mobile terminal of claim 8, wherein:

the surface of the case member covers the first ends of the first and second body portions in the closed configuration of the mobile terminal; and the first ends of the first and second body portions press against the surface of the case member during transitioning between the closed and open configurations of the mobile terminal and cause the first and second connection members to move along the guide rails of the first and second end caps.

10. The mobile terminal of claim 9, wherein:

the first and second connection members move in a direction perpendicular to the surface of the case member during transitioning between the closed and open configurations of the mobile terminal; and the first face of the first body portion and the first face of the second body portion are parallel to each other and to the surface of the case member when the mobile terminal is in the open configuration.

11. The mobile terminal of claim 1, wherein the unit further comprises:

a recess portion formed in each of the first and second end caps with the first slide motion unit disposed in the recess portion of the first end cap and the second slide motion unit disposed in the recess portion of the second end cap; and first and second covers configured to cover the recess portion of the corresponding first and second end cap.

12. A mobile terminal, comprising:

a first body portion having a first end of the first body portion, a second end of the first body portion, a first side of the first body portion, a second side of the first body portion and a first face of the first body portion;

a second body portion having a first end of the second body portion, a second end of the second body portion, a first side of the second body portion, a second side of the second body portion and a first face of the second body portion; and a unit configured to rotatably couple the first end of the first body portion to the first end of the second body portion in order to enable the mobile terminal to transition between a closed configuration and an open configuration, wherein the first face of the first body portion and the first face of the second body portion face each other when the mobile terminal is in the closed configuration with the first side of the first body portion positioned proximate the first side of the second body portion and the second side of the first body portion positioned proximate the second side of the second body portion, wherein the first face of the first body portion and the first face of the second body portion are rotated away from each other when the mobile terminal is in the open configuration, wherein the unit comprises:

a first rotation motion unit coupled to each of the first and second body portions proximate the first side of each of the first and second body portions;

a second rotation motion unit coupled to each of the first and second body portions proximate the second side of each of the first and second body portions;

a first slide motion unit configured to cooperatively operate with the first rotation motion unit;

a second slide motion unit configured to cooperatively operate with the second rotation motion unit;

a first end cap configured to cover end portions of the first sides of the first and second body portions proximate the first ends of the first and second body portions;

a second end cap configured to cover end portions of the second sides of the first and second body portions proximate the first ends of the first and second body portions; and a case member configured to link the first end cap and the second end cap and having a surface positioned parallel to and facing the first ends of the first and second body portion when the mobile terminal is in the closed configuration, wherein the first and second rotation motion units are configured to enable rotational movement between the first and second body portions during transitioning between the closed configuration and the open configuration, wherein the first and second slide motion units are configured to slide the first and second body portions with respect to the unit during transitioning between the closed configuration and the open configuration, wherein the first rotation motion unit comprises:

a first connection member having a first end portion of the first connection member and a second end portion of the first connection member, the second end portion coupled to the first body portion;

a second connection member having a first end portion of the second connection member and a second end portion of the second connection member, the second end portion coupled to the second body portion; and a first hinge portion rotatably coupling the first end portion of the first connection member to the first end portion of the second connection member; and wherein the second rotation motion unit comprises:

a third connection member having a first end portion of the third connection member and a second end portion of the third connection member, the second end portion coupled to the first body portion;

a fourth connection member having a first end portion of the fourth connection member and a second end portion of the fourth connection member, the second end portion is coupled to the second body portion; and a second hinge portion rotatably coupling the first end portion of the third connection member to the first end portion of the fourth connection member.

13. The mobile terminal of claim 12, wherein:
the first slide motion unit comprises:
- a first guide slot having an arcuate shape formed in the first end portion of the first connection member;
- a second guide slot having an arcuate shape formed in the first end portion of the second connection member; and
- first and second guide protrusions positioned on the first end cap and configured to be positioned within the corresponding first or second guide slot; and the second slide motion unit comprises:
- a third guide slot having an arcuate shape formed in the first end portion of the third connection member;
- a fourth guide slot having an arcuate shape formed in the first end portion of the fourth connection member; and
- third and fourth guide protrusions positioned on the second end cap and configured to be positioned within the corresponding third or fourth guide slot.

14. The mobile terminal of claim 13, wherein:
the surface of the case member covers the first ends of the first and second body portions in the closed configuration of the mobile terminal; and
the first ends of the first and second body portions press against the surface of the case member during transitioning between the closed and open configurations of the mobile terminal and cause the first, second, third and fourth guide protrusions to move along the corresponding first, second, third or fourth guide slot.

15. The mobile terminal of claim 1, further comprising:
a first display positioned at the first face of the first body portion and extending to the first end of the first body portion; and
a second display positioned at the first face of the second body portion and extending to the first end of the second body portion,
wherein the first and second displays are positioned such that they are juxtaposed to each other when the mobile terminal is in the open configuration.

16. The mobile terminal of claim 15, wherein:
the first display is positioned in a recess in the first face of the first body portion, the recess extending to the first end of the first body portion and open to the first end of the first body portion; and
the second display is positioned in a recess in the first face of the second body portion, the recess extending to the first end of the second body portion and open to the first end of the second body portion.

* * * * *